United States Patent
Licht et al.

(10) Patent No.: US 10,982,339 B2
(45) Date of Patent: Apr. 20, 2021

(54) PROCESS FOR THE PRODUCTION OF AMMONIA FROM AIR AND WATER

(71) Applicant: C2CNT LLC, Leesburg, VA (US)

(72) Inventors: Stuart Licht, Leesburg, VA (US); Baochen Cui, Ashburn, VA (US); Baohui Wang, Daqing (CN)

(73) Assignee: C2CNT LLC, Leesburg, VA (US)

(*) Notice: Subject to any disclaimer, the term of this patent is extended or adjusted under 35 U.S.C. 154(b) by 141 days.

(21) Appl. No.: 15/305,604

(22) PCT Filed: Apr. 24, 2015

(86) PCT No.: PCT/US2015/027500
§ 371 (c)(1),
(2) Date: Oct. 20, 2016

(87) PCT Pub. No.: WO2015/164730
PCT Pub. Date: Oct. 29, 2015

(65) Prior Publication Data
US 2017/0037521 A1    Feb. 9, 2017

Related U.S. Application Data

(60) Provisional application No. 61/984,423, filed on Apr. 25, 2014.

(51) Int. Cl.
*C01C 1/02* (2006.01)
*C25B 1/00* (2021.01)
(Continued)

(52) U.S. Cl.
CPC .................. *C25B 1/00* (2013.01); *C01C 1/02* (2013.01); *C01C 1/026* (2013.01); *C25B 9/17* (2021.01); *C25B 15/00* (2013.01)

(58) Field of Classification Search
CPC .............. C25B 1/00; C01C 1/02; C01C 1/026
See application file for complete search history.

(56) References Cited

U.S. PATENT DOCUMENTS

| 2003/0159942 A1* | 8/2003 | Minevski | C25B 1/00 205/477 |
| 2006/0049063 A1* | 3/2006 | Murphy | C25B 1/00 205/552 |

(Continued)

FOREIGN PATENT DOCUMENTS

| JP | 2012026036 A * | 2/2012 | C25B 1/00 |

OTHER PUBLICATIONS

Lan et al, "Synthesis of Ammonia Directly from Wet Air at Intermediate Temperature," Applied Catalysis B: Environmental 152-153 (2014) 212-217 (Year: 2014).*

(Continued)

*Primary Examiner* — Salil Jain
(74) *Attorney, Agent, or Firm* — Blank Rome LLP

(57) ABSTRACT

The present disclosure relates to a simple one-pot process for the production of ammonia. The process involves electrolysis of air and water using a molten or concentrated aqueous hydroxide electrolyte in the presence of an iron catalyst. The process exhibits one or more of the following benefits: (i) it is an efficient, cost-effective low-energy process, (ii) it eliminates carbon dioxide (CO2) evolution, (iii) it eliminates the need for a separator, and (iv) it bypasses the need for a preliminary hydrogenation step.

111 Claims, 12 Drawing Sheets

(51) Int. Cl.
*C25B 9/06* (2006.01)
*C25B 15/00* (2006.01)
*C25B 9/17* (2021.01)

(56) References Cited

U.S. PATENT DOCUMENTS

| | | | |
|---|---|---|---|
| 2008/0193360 A1 | 8/2008 | Holbrook et al. | |
| 2008/0213157 A1* | 9/2008 | McGrady | C01C 1/0405 423/353 |
| 2009/0117014 A1* | 5/2009 | Carpenter | C01C 1/0411 422/148 |
| 2012/0082612 A1 | 4/2012 | Carpenter et al. | |
| 2012/0241328 A1* | 9/2012 | Joshi | C25B 1/00 205/552 |
| 2013/0140217 A1* | 6/2013 | Gordon | C10G 29/04 208/235 |
| 2014/0131217 A1* | 5/2014 | Buschmann | C01B 7/01 205/440 |
| 2015/0122666 A1 | 5/2015 | Estrada | |
| 2016/0083853 A1* | 3/2016 | Botte | C25B 1/00 205/338 |
| 2016/0194767 A1* | 7/2016 | Mulder | C25B 11/04 205/338 |

OTHER PUBLICATIONS

Sigma-Aldrich, "Iron(II,III) oxide" Feb. 4, 2014 [online], [retrieved on Aug. 6, 2015]. Retrieved fromteh Internet: <URL: https://web.archive.org/web/20140204181553/http://www.sigmaaldrich.com/catalog/product/adrich/637106?lang+en®ion=>.

American Elements, "Iron Nanaparticles" Oct. 29, 2013 [online], [retrieved on Aug. 6, 2015]. Retrieved from the Internet: <URL: https://web.archive.org/web/201310290908323/http://www.americanelements.com/tenp.html>.

Lan et al. Synthesis of ammonia directly from wet air at intermediate temperature. Applied Catalysis B. Environmental. Jan. 27, 2014, vol. 153-153, pp. 212-217 [retrieved on Aug. 6, 2015]. Retrieved from the Internet: <URL: http://www.sciencedirect.come/science/article/pii/S0926337314000435>.

* cited by examiner

PROCESS FOR THE PRODUCTION OF AMMONIA FROM AIR AND WATER

This application is a U.S. national stage of International Patent Application No. PCT/US2015/027500, filed Apr. 24, 2015, which claims the benefit of U.S. Provisional Application No. 61/984,423 filed Apr. 25, 2014. The entire content of those applications is hereby incorporated by reference in their entirety.

STATEMENT REGARDING FEDERALLY SPONSORED RESEARCH

This invention was made with partial United States Government support under NSF Grant No. 123072 and Award No. N000014-13-0791 awarded by the Office of Naval Research. The United States Government has certain rights in this invention.

FIELD OF THE INVENTION

The present invention relates to a simple one-pot process for the production of ammonia. The process involves electrolysis of air and water using a molten hydroxide electrolyte in the presence of an iron catalyst. The process exhibits one or more of the following benefits: (i) it is an efficient, cost-effective low-energy process, (ii) it eliminates carbon dioxide ($CO_2$) evolution, (iii) it eliminates the need for a separator, and (iv) it bypasses the need for a preliminary hydrogenation step.

BACKGROUND OF THE INVENTION

The Haber-Bosch process annually hydrogenates over 120 million tons of $N_2$ from the atmosphere (see, e.g., Smil, *Enriching the Earth: Fritz Haber, Carl Bosch, and the Transformation of World Food Production* (MIT Press, Cambridge, Mass., 2004) and Rockstron, et al., *Nature*, 461, 472-475, 2009) to produce ammonia for fertilizer (Eq. 1) (see Strait, et al., *Nitrogen+Syngas* 303, 1-3, 2010). Today, hydrogen for ammonia synthesis is produced primarily through steam reformation, which consumes 3-5% of the world's natural gas production and releases large quantities of $CO_2$ to the atmosphere.

$$N_2 + 3H_2 \rightarrow 2NH_3 \qquad (1)$$

$$CH_4 + 2H_2O \rightarrow 4H_2 + CO_2 \qquad (2)$$

The ammonia hydrogenation reaction is separate from the steam reforming reaction that generates the required hydrogen (Eq. 2). Renewable energy driven water splitting may provide an alternative $H_2$ source, but economic, non-$CO_2$ emitting sources of $H_2$ have yet to be proven on the industrial scale. Although ammonia hydrogenation is exothermic, it is kinetically disfavored at ambient temperature and pressure. In the Haber-Bosch process, this kinetic limitation is overcome by using an iron based catalyst, repeated cycling, high pressure and elevated temperatures. These conditions are energy intensive and consume 2% of world energy production.

Several electrochemical processes have been pursued to provide alternative syntheses of $NH_3$. The electrolytic formation of nitrides from nitrogen gas in molten alkali chlorides has been reported (Bonomi et al., *J. Electrochem. Soc.*, 124, 982-986, 1977 and Bonomi et al., *J. Electrochem. Soc.*, 126, 248-251, 1979), including subsequent reactions with hydrogen to yield ammonia. However, these have not led yet to commercial production of ammonia due to several challenges, including the competing back-reaction of nitride to nitrogen (see, e.g., Murakami et al., *J. Amer. Chem. Soc.* 125, 334-335, 2003; Ito et al., *J. Nuc. Energ.* 344, 128-125, 2005; Murakami et al., *Electrochem. Solid-State Lett.* 8, D12-D14, 2005; Murakami et al., *Electrochem. Solid-State Lett.*, 10, E4-E6, 2007; and Serizawa et al., *J. Electrochem. Soc.* 159, E87-E91, 2012). In 1985, room temperature electrolytic synthesis of ammonia was described, albeit at low rate, via protolyis of $W(N_2)_2(PMe_2Ph)_4$ (see Pickett et al., *Nature*, 317, 1845-653, 1985).

Ammonia has been synthesized from $H_2$ and $N_2$ in aqueous sulfate solutions using metal-phthaolcyanine ($C_{32}H_{18}N_8$) complexes loaded onto carbon black as a cathode and platinum loaded onto carbon black as an anode. Again, this only operates at a low rate. Density functional calculations have been used to evaluate hydrogen and nitrogen adsorption and/or reduction on a variety of transition metals as possible electrocatalysts in ammonia formation (see Skulason et al., *Phys. Chem. Chem. Phys.*, 3, 1235-1245, 2012). The solid-state electrochemical synthesis of ammonia in two compartment cells with either proton or oxide ion conductors has been described with the highest rate reported at 80° C. and 2 Volts using a NAFION® (a sulfonated tetrafluoroethylene based fluoropolymer-copolymer, DuPont) membrane separator (see Amar et al., *J. Solid State Electrochem.*, 15, 1845-1860, 2011).

There are reports of using water or steam as a reactant in lieu of hydrogen for the electrosynthesis of ammonia, as a means to avoid the $CO_2$ emissions shown in Eq. 2. The rate of ammonia formation is, however, several orders of magnitude lower, and the coulombic efficiency drops to less than 1% when using water, rather than $H_2$ (see Amar et al., *J. Solid State Electrochem.*, 15, 1845-1860, 2011). One study discloses a strontia-ceria-ytterbia oxide proton conducting solid electrolyte at 450° C. to 700° C. and a ruthenium based catalyst but reports that the conversions with respect to nitrogen or steam were low, primarily because of the poor conductivity of the working electrode (see Skodra et al., *Solid State Ionics*, 180, 1332-1336, 2009). Using a NAFION separator in aqueous 2 M KOH with a Ru/C cathode, enabled ammonia synthesis from water and nitrogen at a rate of a maximum coulombic efficiency of 0.9% at $2.8 \times 10^{-12}$ mol $NH_3$ s$^{-1}$ cm$^{-2}$ at 20° C. and, at 90° C. a maximum rate of $2.1 \times 10^{-11}$ mol s$^{-1}$ cm$^{-2}$ at 0.2% efficiency (see Kordali et al., *Chem. Comm.*, 1673-1674, 2000). Using Pt/C on a gas diffusion layer at both electrodes and room temperature NAFION as the electrolyte yielded $NH_3$ at a higher rate of $1.1 \times 10^{-9}$ mol s$^{-1}$ cm$^{-2}$, consuming water at the anode and air at the cathode at 0.6% coulombic efficiency (see Lan et al., *Sci. Rep.*, 3, 1145, doi:10.1038/srep01145, 2013). Recently, ammonia has been formed at 0.8% coulombic efficiency and a similar rate of $0.9 \times 10^{-19}$ mol s$^{-1}$ cm$^{-2}$ using Pt/C electrodes and a NAFION membrane (see Lan et al., *RSC Adv.*, 3, 18016-18021, 2013).

A eutectic NaOH/KOH cell for splitting water into hydrogen and oxygen, as shown in Eq. 3, has been described (see Ganley et al., *Int. J. Hydrogen Energy*, 34, 3604-3611, 2009 and Licht et al., *Chem. Comm.*, 23, 3006-3007, 2003).

$$H_2O \rightarrow H_2 + \tfrac{1}{2}O_2 \qquad (3)$$

There is a need for a new, efficient process for the production of ammonia that is low energy and, more importantly, eliminates carbon dioxide ($CO_2$) production, thereby reducing carbon footprint and greenhouse gas emissions.

SUMMARY OF THE INVENTION

The present inventors have developed a simple one-pot process for the production of ammonia. The process involves electrolysis of air and water using a molten or concentrated aqueous hydroxide electrolyte in the presence of an iron catalyst. The process exhibits one or more of the following benefits: (i) it is an efficient, cost-effective low-energy process, (ii) it eliminates carbon dioxide ($CO_2$) evolution, (iii) it eliminates the need for a separator, and (iv) it bypasses the need for a preliminary hydrogenation step.

In one aspect, the present invention relates to a process for the production of ammonia from air and water.

In one embodiment, the process comprises electrolysis of air and water between an anode and a cathode in a molten or concentrated aqueous hydroxide electrolyte comprising iron or iron oxide, wherein the iron or iron oxide has a surface area greater than about 10 $m^2/g$.

In one embodiment, the process comprises electrolysis of air and water between an anode and a cathode in a molten or concentrated aqueous hydroxide electrolyte comprising iron or iron oxide, wherein the iron or iron oxide has an average particle size less than about 5000 nm.

In one embodiment, the process comprises electrolysis of air and water between an anode and a cathode in a molten or concentrated aqueous hydroxide electrolyte comprising iron or iron oxide, wherein the iron or iron oxide has (i) a surface area greater than about 10 $m^2/g$, or (ii) an average particle size less than about 5000 nm.

In one embodiment of any process described herein, the molten or concentrated aqueous hydroxide electrolyte comprises iron.

In one embodiment of any process described herein, the molten or concentrated aqueous hydroxide electrolyte comprises iron oxide. In one embodiment, iron oxide is reduced at the cathode during the process.

In another embodiment of any process described herein, carbon dioxide is not formed during the process.

In a further embodiment of any process described herein, the iron or iron oxide has an average particle size less than about 4000 nm, such as less than about 3000 nm, less than about 2000 nm, less than about 1000 nm, less than about 500 nm, less than about 200 nm, less than about 150 nm, less than about 100 nm, less than about 75 nm, less than about 50 nm, less than about 25 nm, less than about 10 nm, less than about 5 nm, less than about 2 nm or less than about 1 nm.

In further embodiments of any process described herein, the iron or iron oxide has an average particle size between about 1 nm and about 3000 nm, between about 1 nm and about 1000 nm, between about 10 nm and about 3000 nm, between about 10 nm and about 1000 nm or between about 50 nm and about 1000 nm, such as about 500 nm.

In a further embodiment of any process described herein, the iron or iron oxide has a Brunauer-Emmett-Teller (BET) surface area (which may be measured by, for example, nitrogen adsorption) greater than about 15 $m^2/g$, such as greater than about 20 $m^2/g$, greater than about 30 $m^2/g$, greater than about 40 $m^2/g$, or greater than about 50 $m^2/g$. For example, in some embodiments, the iron oxide has a surface area between about 10 $m^2/g$ and about 100 $m^2/g$, between about 25 $m^2/g$ and about 75 $m^2/g$, between about 30 $m^2/g$ and about 60 $m^2/g$ or between about 30 $m^2/g$ and about 40 $m^2/g$, such as about 33 $m^2/g$ or about 35 $m^2/g$. In additional embodiments, the iron or iron oxide has a BET surface area sufficient to promote the conversion of nitrogen and hydrogen to ammonia.

In one embodiment of any process described herein, the iron oxide is in the form of a hydrate, e.g., a hemihydrate, sesquihydrate, monohydrate or a dihydrate. In one embodiment, the iron oxide is $Fe_2O_3(H_2O)_x$ wherein x is any value between about 0 and about 2, such as any value between about 1 and about 2.

In another embodiment of any process described herein, the process is conducted at a temperature of between about 25° C. and about 500° C., between about 50° C. and about 300° C., between about 100° C. and about 250° C., between about 150° C. and about 250° C., between about 150° C. and about 225° C. or between about 225° C. and about 500° C. For example, in one embodiment, the process is conducted at a temperature of about 200° C.

In one embodiment of any process described herein, the molten or concentrated aqueous hydroxide electrolyte is selected from alkali metal hydroxides, alkali earth metal hydroxides, and any combination thereof. For example, the molten or concentrated aqueous hydroxide electrolyte is selected from lithium hydroxide, sodium hydroxide, potassium hydroxide, caesium hydroxide, and any combination thereof. In one embodiment, the molten or concentrated aqueous hydroxide electrolyte comprises sodium hydroxide and potassium hydroxide (such as, but not limited to, a 1:1 molar ratio of sodium hydroxide and potassium hydroxide).

In one embodiment of any process described herein, the electrolysis is conducted at an applied current of between about 5 mA and about 2500 mA, such as between about 10 and about 2000 mA, between about 20 and about 500 mA, between about 20 and about 250 mA or between about 10 and about 500 mA. For example, the electrolysis is conducted at an applied current of about 7 mA, about 10 mA, about 20 mA, about 250 mA or about 2000 mA. In one embodiment, the electrolysis is conducted at an applied current of about 20 mA.

In another embodiment of any process described herein, the electrolysis is conducted at an applied current of between about 0.5 $mA\,cm^{-2}$ and about 250 $mA\,cm^{-2}$, such as between about 1 $mA\,cm^{-2}$ and about 200 $mA\,cm^{-2}$, between about 2 $mA\,cm^{-2}$ and about 50 $mA\,cm^{-2}$, between about 2 $mA\,cm^{-2}$ and about 25 $mA\,cm^{-2}$ or between about 1 $mA\,cm^{-2}$ and about 50 $mA\,cm^{-2}$. For example, the electrolysis is conducted at an applied current of about 0.7 $mA\,cm^{-2}$, about 1 $mA\,cm^{-2}$, about 2 $mA\,cm^{-2}$, about 25 $mA\,cm^{-2}$ or about 200 $mA\,cm^{-2}$. In one embodiment, the electrolysis is conducted at an applied current of about 2 $mA\,cm^{-2}$.

In one embodiment of any process described herein, the anode and cathode both comprise nickel.

In a further embodiment of any process described herein, the process is conducted at a pressure of between about 1 bar and about 50 bar of water, such as between about 1 bar and about 25 bar of water, between about 1 bar and about 20 bar of water or between about 1 bar and about 10 bar of water. In one embodiment, the process is conducted at 1 bar. In another embodiment, the process is conducted at 25 bar of water, e.g., in a constrained volume.

In a further embodiment of any process described herein, the process is conducted at a pressure of between about 50 bar and about 221 bar of water.

In a further embodiment of any process described herein, the process is conducted above the supercritical point of water.

In a further embodiment of any process described herein, the process is conducted at a pressure of between about 1 bar and about 100 bar of nitrogen.

In a further embodiment of any process described herein, the process is conducted at a pressure of between about 100 bar and about 10,000 bar of nitrogen water.

In another embodiment of any process described herein, the chemistry of the process can be expressed by equations (i), (ii), (iii) and (iv):

$$\text{cathode: } Fe_2O_3 + 3H_2O + 6e^- \rightarrow 2Fe + 6OH^- \quad (i)$$

$$\text{chemical: } 2Fe + 3H_2O + N_2 \rightarrow 2NH_3 + Fe_2O_3 \quad (ii)$$

$$\text{anode: } 6OH^- \rightarrow 3/2 O_2(g) + 3H_2O + 6e^- \quad (iii)$$

$$\text{net: } N_2 + 3H_2O \rightarrow 2NH_3 + 3/2 O_2 \quad (iv).$$

In another embodiment of any process described herein, the coulombic efficiency (i.e., the percentage of applied current that results in the 6 electron conversion of $N_2$ and water to $NH_3$) is greater than about 5%, such as greater than about 10%, greater than about 20%, greater than about 25%, greater than about 50%, or greater than about 75%, at a current of, for example, 2 mA cm$^{-2}$. In one embodiment, the coulombic efficiency is about 71% at a current of, for example, 0.7 mA cm$^{-2}$.

In another embodiment, the present invention relates to a process for the production of ammonia comprising the chemical reaction of air and water in a molten or concentrated aqueous hydroxide solution comprising iron, wherein the iron has an average particle size of less than about 3000 nm.

In another embodiment, the present invention relates to a process for the production of ammonia comprising the chemical reaction of air and water in a molten or concentrated aqueous hydroxide solution comprising iron, wherein the iron has an average particle size of less than about 300 nm.

In another embodiment, the present invention relates to a process for the production of ammonia comprising the chemical reaction of air and water in a molten or concentrated aqueous hydroxide solution comprising iron, wherein the iron has (i) an average particle size of less than about 3000 nm or (ii) an average particle size of less than about 300 nm.

In another embodiment, the present invention relates to a process for the production of ammonia comprising electrolysis of dissolved iron oxide in a solubilizing molten electrolyte (e.g., a molten alkali or alkali earth metal carbonate, or any mixture thereof, optionally with other added salts as described herein), wherein (i) the iron oxide is electrochemically at the cathode reduced to form iron between a cathode and anode;

(ii) the iron chemically reacts with added water and air to form iron oxide and ammonia products; and (iii) the iron oxide product is again electrochemically reduced to allow for the continued formation of ammonia with added water and air.

In one embodiment, the molten electrolyte comprises an alkali metal carbonate (e.g., lithium carbonate, sodium carbonate, potassium carbonate, caesium carbonate), an alkali earth metal carbonate (e.g., magnesium carbonate, calcium carbonate), or any combination of the foregoing.

In one embodiment, the molten electrolyte comprises lithium carbonate.

In another embodiment the molten electrolyte comprises lithium carbonate and an alkali metal or alkali earth metal hydroxide.

In another embodiment, the molten electrolyte comprises dissolved iron oxide.

In one embodiment, the molten electrolyte comprises lithium carbonate and dissolved iron oxide.

DETAILED DESCRIPTION OF THE INVENTION

The present invention relates to a simple one-pot process for the production of ammonia. The process proceeds via electrolysis of air and water using a molten or concentrated aqueous hydroxide electrolyte in the presence of an iron catalyst. The process exhibits one or more of the following benefits: (i) it is an efficient, cost-effective low-energy process, (ii) it eliminates carbon dioxide ($CO_2$) evolution, (iii) it eliminates the need for a separator, and (iv) it bypasses the need for a preliminary hydrogenation step.

Combining the chemistry of Eq. 3 with that of Eq. 1 in a highly conductive molten hydroxide for the hydrogen generation, and in the presence of an appropriate ammonia catalyst such as iron, provides a one-pot medium for the electrolytic synthesis of ammonia from air and water, according to Eq. 4:

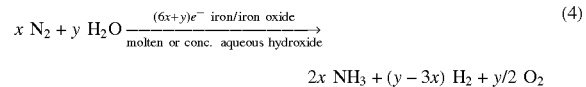

$$2x\ NH_3 + (y-3x)\ H_2 + y/2\ O_2$$

Figure 1:
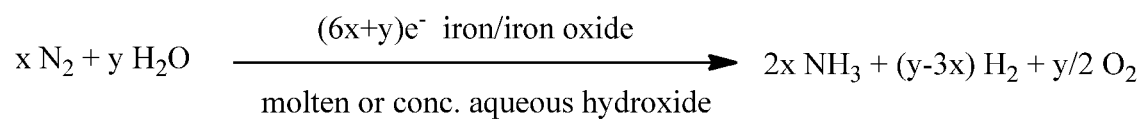
FIG. 1 shows the reaction for the one pot synthesis of ammonia without production of $CO_2$.

FIG. 1 shows the reaction for the one pot synthesis of ammonia without production of $CO_2$. The synthesis proceeds via the electrolysis of steam to $H_2$ in a molten or concentrated aqueous hydroxide electrolyte, adsorption of the $H_2$ with $N_2$ from the air onto the catalyst, rearrangement, and subsequent release of ammonia. The electrolysis energy is temperature and pressure dependent, decreasing rapidly at a high reactant to product ratio.

Figure 2:
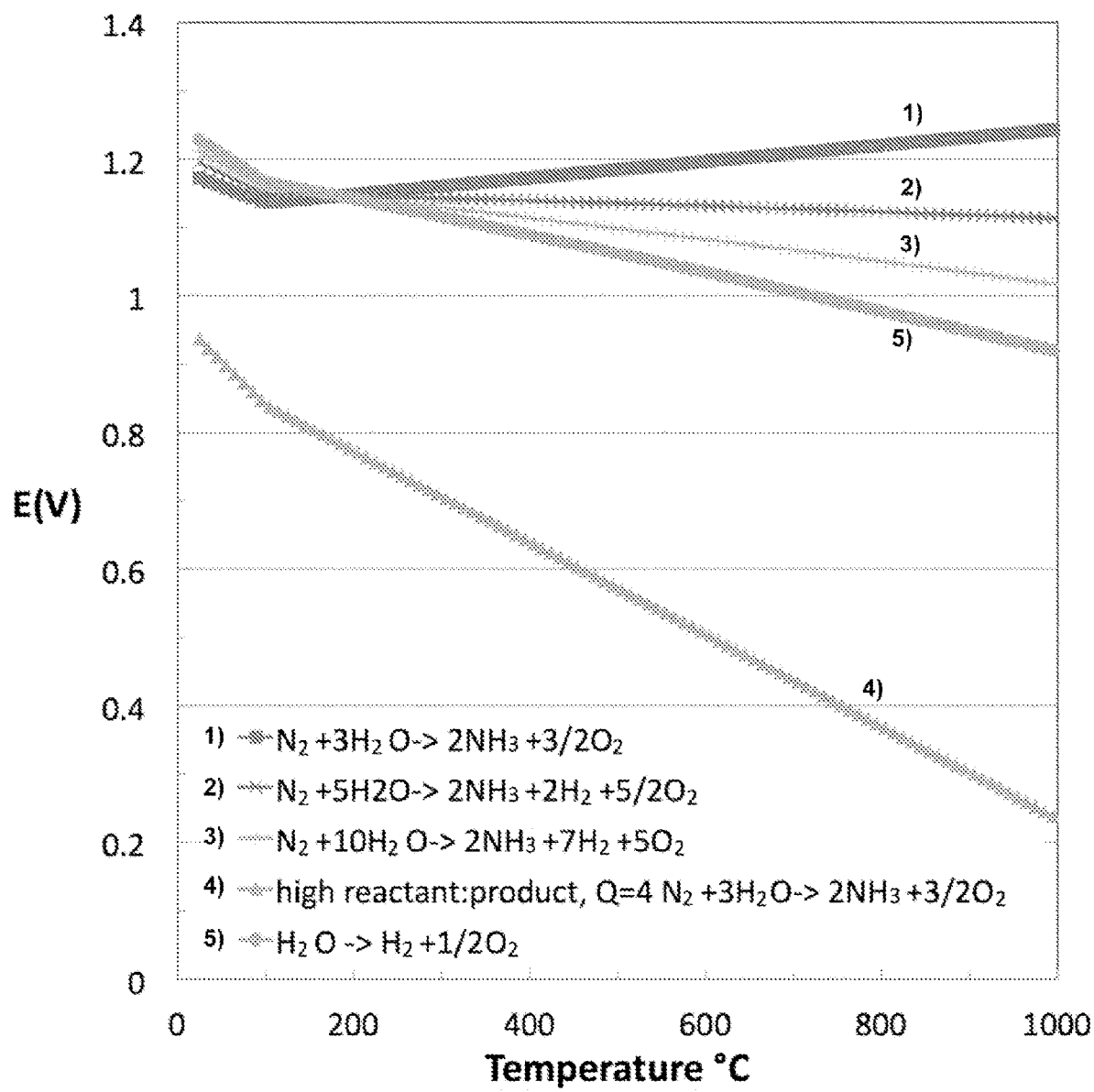
FIG. 2 shows the thermodynamic electrolysis potentials for water splitting and for water based ammonia syntheses.

FIG. 2 shows thermodynamic potentials for water splitting and the reaction of nitrogen with water, which exhibit similar redox potentials at room temperature. Alternative ammonia producing reactions are calculated, such as the reaction of $N_2$ with several water molecules that may occur in a molten hydroxide medium. In each case, the electrolysis potential is calculated from the known temperature variation of the entropy and enthalpies of the reactants and products, using the convention to describe the positive potential necessary to drove a non spontaneous potential, $E_T = \Delta G(T)/nF$ (see, e.g., Chase; *J. Phys. Chem. Ref Data*, 9, 1, 1998; and Licht, *J. Phys. Chem. C.*, 113, 16283-16292, 2009). The upper curves (1-3 and 5) are calculated at unit activity, whereas the lower curve (4) is calculated at a high ratio of reactants to products given by Q=4=log(10 000), that is $a_{NH_3}^2 a_{O_2}^{3/2}/a_{N_2}a_{H_2O}^3 = 10\ 000$. Electrolysis provides control of the relative amounts of reactant and generated product in a system. A substantial activity differential (Q>1) can also lower E(V) to drive improvement at elevated temperatures.

Based on these calculations, when three $H_2O$ molecules, rather than $H_2$, act as the hydrogen source for the $NH_3$ (Eq. 5), the potential decreases up to the water boiling point, but then increases with temperature.

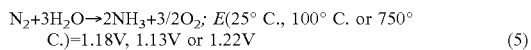

With more than three $H_2O$ equivalents per $N_2$, as in Eq. 6, hydrogen is cogenerated as a product along with ammonia and, as seen in FIG. 2, the electrolysis potential decreases with increasing water.

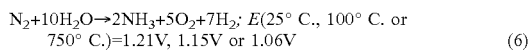

The free energy and hence potential variation with activity, a, of the reaction is, $$\Delta G(T,a) = \Delta G°(T) + RT \ln((\Pi_{i=1\ to\ x} a(R_i)^{r_i}/\Pi_{i=1\ to\ y} a(C_i)^{c_i}) = \Delta G°(T) + 2.303RTQ;\ \text{where}\ Q = \log((\Pi_{i=1\ to\ x} a(R_i)^{r_i}/\Pi_{i=1\ to\ y} a(C_i)^{c_i}) \quad (7)$$

in which R is the gas constant, T is the Kelvin temperature and $R_i$ an $C_i$ represent the products and reactants. Variable Q in Eq. 7 combines the log of the reaction quotient and n into a single term to assess the magnitude of this Nernst effect, and reflects the relative activity of the reactants compared to products. Equation 5 yields $Q = \log(a_{NH_3}^2 a_{O_2}^{3/2}/a_{N_2}a_{H_2}O^3)/6$. As shown in FIG. 2, with appropriate choice of medium, this Eq. 7 Nernst effect can generate a dramatic energy decrease in the required electrolysis potential, for example in molten electrolytes, when the water reactant and nitrogen concentrations are high and the product concentration is relatively low. The effect is enhanced proportionally to the relative increases in the Kelvin temperature. Compared to Q=1 in Eq. 5:

$$Q=4:\ N_2+3H_2O \to 2NH_3+3/2O_2;\ E(25°, 100°\ C.\ or\ 750°\ C.)=0.94V,\ 0.83V\ or\ 0.39\ V \quad (8)$$

The Molten Electrolyte

The process of the present invention utilizes a molten or concentrated aqueous hydroxide electrolyte. Suitable molten or concentrated aqueous hydroxide electrolytes include, but are not limited to, alkali metal hydroxides, alkali earth metal hydroxides, and any combination thereof, in any molar ratio. For example, the molten or concentrated aqueous hydroxide electrolyte may be selected from lithium hydroxide, sodium hydroxide, potassium hydroxide, caesium hydroxide, and any combination thereof, in any molar ratio. In one embodiment, the molten or concentrated aqueous hydroxide electrolyte comprises sodium hydroxide and potassium hydroxide in any molar ratio (such as, but not limited to, a 1:1 molar ratio of sodium hydroxide and potassium hydroxide).

Any of the electrolytes (e.g., the molten or concentrated aqueous hydroxide electrolytes) described herein may further comprise additional additives, e.g., alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, and combinations thereof, such as, but not limited to, barium carbonate ($BaCO_3$), cesium carbonate ($Cs_2CO_3$), calcium carbonate ($CaCO_3$), magnesium oxide ($MgO$), calcium oxide (CaO), and any combination thereof. Additionally, any of the molten or concentrated aqueous hydroxide electrolytes described herein may also comprise an alkali metal nitrate (e.g., $NaNO_2$) an alkali metal halide (e.g., KCl), or any combination thereof.

The electrolytic reactions described herein are typically conducted at a temperature greater than the melting point of the molten or concentrated aqueous hydroxide (or combination of hydroxides) used as the electrolyte.

In one embodiment, the melting point of the electrolyte, (i.e, the operating temperature of the process) is (i) between about 25° C. and about 500° C., (ii) between about 100° C. and about 300° C., or (iii) between about 150° C. and about 250° C. In one embodiment, the melting point of the electrolyte, (i.e, the operating temperature of the process) is about 170° C., about 195° C., about 200° C., about 215° C., or about 225° C.

In another embodiment, the process is conducted at a temperature of between about 25° C. and about 500° C., such as between about 50° C. and about 300° C., between about 100° C. and about 250° C., between about 150° C. and about 250° C., between about 150° C. and about 225° C. or between about 225° C. and about 500° C. For example, in one embodiment, the process is conducted at a temperature of about 200° C.

The Anode

The anode can be made of any inert material which is stable under the operating conditions of the process. Effective materials include metals, such as nickel, platinum or iridium, metal oxides such as nickel oxide, tin oxide and titanium oxide, metal alloys such as monel and inconel, and carbon based materials such as glassy carbon and graphite. Enhanced anode surface area, such as with screen or spongy materials, by physical roughening, by chemical or electrochemical etching, or as deposited on a conductive support, decreases electrolysis potential. In one embodiment, the anode comprises nickel. In one embodiment, the anode comprises lithiated nickel.

The Cathode

The cathode can be made of any conductive material stable under the operating temperature of the process. Effective materials include metals, such as steel, nickel, platinum or iridium. Enhancing the surface are of the cathode (for example, by using a screen or a spongy material, roughening the cathode surface, chemically or electrochemically etching the cathode surface, or depositing ion a conductive support) decreases the electrolysis potential. In one embodiment, the cathode comprises nickel.

Experimental

The present invention is now further illustrated by means of the following non-limiting disclosure.

Materials

Anhydrous sodium hydroxide (Sigma-Aldrich), potassium hydroxide (Sigma-Aldrich, KOH.½H$_2$O), cesium hydroxide (99.9% CsOH.1-2H$_2$O Alfa-Aesar) and lithium hydroxide (anhydrous, 98%, Acros Organics 37918) were combined to form various eutectic molten hydroxide electrolytes each with melting points less than 300° C. The pure anhydrous alkali hydroxides each melt only at temperatures greater than 300° C.; LiOH ($T_{mp}$=462° C.), NaOH ($T_{mp}$=318° C.), KOH ($T_{mp}$=406° C.) and CsOH ($T_{mp}$=339° C.). In contrast, molar ratios of 0.3:0.7 LiOH/NaOH, 0.3:0.7 LiOH/KOH, 0.5:0.5 NaOH/KOH and 0.44:0.56 KOH/CsOH melt at 215° C., 225° C., 170° C. and 195° C., respectively (see e.g., Ganley, *J. Power Sources*, 197, 44-47, 2008), and are even lower when hydrated hydroxide salts are used. Conventional microscopic Fe$_2$O$_3$ (99.4%, J. T. Baker) or high surface area nanoscopic (20-40 nm particles, BET surface area: 30-60 m$^2$/g AlfaAesar, NanoArc; Certificate of Analysis, 99.9% iron oxide, 35 nm average particle size, 33 m$^2$ g$^{-1}$ BET surface area) Fe$_2$O$_3$ was added to the molten hydroxide electrolytes to promote ammonia formation.

As used herein, the terms "nanoscopic Fe$_2$O$_3$" and "nano-Fe$_2$O$_3$" refer to iron oxide have an average particle size less than about 5000 nm, such as than about 4000 nm, such as less than about 3000 nm, less than about 2000 nm, less than about 1000 nm, less than about 500 nm, less than about 200 nm, less than about 150 nm, less than about 100 nm, less than about 75 nm, less than about 50 nm, less than about 25 nm, less than about 10 nm, less than about 5 nm, less than about 2 nm or less than about 1 nm. The terms "nanoscopic Fe$_2$O$_3$" and "nano-Fe$_2$O$_3$" also may refer to iron oxide have an average particle size between about 1 nm and about 3000 nm, between about 1 nm and about 1000 nm, between about 10 nm and about 3000 nm, between about 10 nm and about 1000 nm, between about 1 nm and about 500 nm, such as between about 1 nm and about 200 nm, between about 10 nm and about 100 nm, between about 10 nm and about 50 nm or between about 20 nm and about 40 nm, such as about 35 nm or about 500 nm.

As used herein, the terms "macroscopic Fe$_2$O$_3$," "macro-Fe$_2$O$_3$" and "conventional Fe$_2$O$_3$" refer to iron oxide have an average particle size greater than the "nanoscopic Fe$_2$O$_3$" or "nano-Fe$_2$O$_3$," as defined above.

Gas input to the electrolysis chamber described herein consisted of either (A): wet (1) 99.999% nitrogen (ultra high purity nitrogen generator 3000 cc/min), (2) argon, bubbled through double deionized water to water saturation at room temperature (2.6% water at 22° C.), or (3) air bubbled through a 1 M KOH solution to remove carbon dioxide and saturate with water at room temperature, or (B): the dry gases. Gas flow was maintained at 4.1 mL min$^{-1}$ in the 20 mA electrolyses and 111 mL min$^{-1}$ in the 250 mA electrolyses. For mass balance, the wet (water saturated) gases provide sufficient water ($8\times10^{-8}$ or $2\times10^{-6}$ mol H$_2$O/s, respectively) for the hydrogen generation component of the electrolysis and excess nitrogen. The 2000 mA experiments were conducted with a flow rate of 222 (and also a slow flow experiment of 2.2) mL min$^{-1}$. The latter (2000 mA, slow flow of 2.2 ml min$^{-1}$) experiment constrains steam and nitrogen entering the cell and yields 62% of the initial ammonia production rate of the fast flow experiment, and, respectively, after 4 or 6 hours exhibited an ammonia rate of only 13% or 5% of the initial two hour average rate. Excluding either nitrogen or water from the cell decreased (essentially zeroed) the ammonia output from the electrolysis cell. The electrolysis was conducted in a pure alumina crucible (AdValue, 99.6%). In the alumina crucible cell, the anode was a pure Ni (McMaster 200) shim cut to 10 cm$^2$. The 10 cm$^2$ Ni cathode was a 200 mesh woven wire cloth (Alloy 400, Monet, McMaster). This Monet cathode mesh is stable in the molten 200° C. hydroxide. In contrast, a 316 stainless steel mesh was observed to slowly react, forming hydrogen. The electrodes were connected externally by spot welded Ni wire (99.5% Alfa Aesar).

Calculations

Thermodynamic electrolysis potentials for water splitting and ammonia synthesis with water were calculated from the unit activity thermochemical data for the individual species, using the convention to describe the positive potential necessary to drive a non spontaneous potential (see McKone et al., *Chem. Sci.*, 5, 865-878, 2014; Santos *Quimica*, 8, 1176-1193, 2013; and Zeng et al., *Porg. Energy Combustion Sci.* 36, 307-326, 2010) from the reactions:

$\Sigma_{i=1\ to\ x}\ r_i R_i \rightarrow \Sigma_{i=1\ to\ y}\ c_i C_i$; using $E_T=\Delta G(T)/nF$ and $\Delta G°(T)=\Sigma_{i=1\ to\ y}\ c_i(H°(C_i,\ T)-TS°(C_i,\ T))-\Sigma_{i=1\ to\ x}\ r_i(H°(R_i,\ T)-TS°(R_i,\ T))$.

Electrolysis provides control of the relative amounts of reactant and generated product in a system. A substantial activity differential can also drive improvement at elevated temperature. The free energy and hence potential variation with activity, a, of the reaction is, $\Delta G(T,a)=\Delta G°(T)+RT\ln((\Pi_{i=1\ to\ x}\ a(R_i)^{r_i}/\Pi_{i=1\ to\ y}\ a(C_i)^{c_i})=\Delta G°(T)+2.303RTQ;$ where $Q=\log((\Pi_{i=1\ to\ x}\ a(R_i)^{r_i}/\Pi_{i=1\ to\ y}\ a(C_i)^{c_i})$.

Methods and Results

A single chamber electrolysis configuration was used to electrolyze water saturated air or N$_2$ to NH$_3$. In addition, a double chamber cell configuration was used to confirm that ammonia was separately generated at the cathode and oxygen at the anode.

Figure 3:
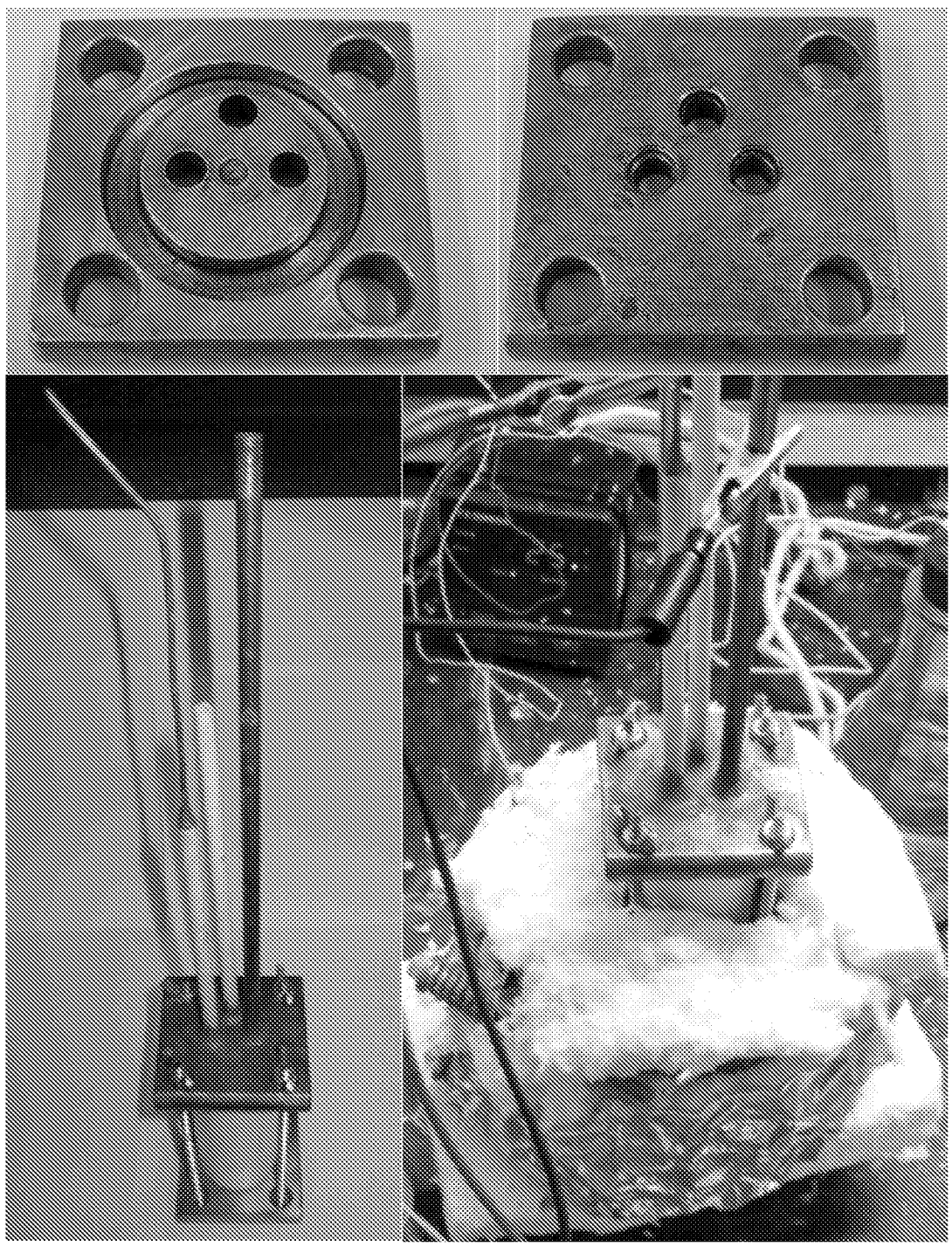
FIG. 3 shows a single chamber electrolysis cell configuration as described in the examples. Top left and right photos: underside and top of cell cover. Bottom left: alumina crucible situated in the cover groove and bolted closed. Above the cell, from left to right is the anode electrical connected sheathed in alumina, the alumina gas outlet and on the right side an Inconnel tube functioning as both the gas inlet & the cathode electrical connection. Bottom, right: the electrolysis sitting within the band heater (not visible) and surrounded by insulation.

The single chamber configuration used in the experiments described herein is shown in FIG. 3. A stainless steel (316 alloy) cover is cut with a groove on the lower side that matches the circumference of the alumina crucible (100 ml alumina crucible Advent AL-2100). The cover to crucible seal is gas-leak free when the groove is filled with a high temperature adhesive (Resbond 907 heavy grade adhesive) and the cover is compressed to the crucible by four outer bolts through the cover and a bottom plate, as seen in FIG. 3. 0.25" Inconel (McMaster 89865K) or alumina tubes (McMaster 8746K) pass through the cover into the electrolyzer, and are gas-leak free when sealed with the Resbond 907. The middle alumina tube becomes the outlet gas exit, which is bubbled through an ammonia trap, as described below. The anode connecting wire seen on the left side is in an alumina tube. The Inconnel tube, seen on the right side, functions as both the cathode electrical connection and as the gas inlet. Either $N_2$ or air, and water vapor enters through this inlet. The anode and cathode tubes are also sealed at the cover with Resbond 907 adhesive. In addition, the cathode tube is connected to the inlet gas (either $N_2$ or air and water vapor). The cell is situated within a 1700 W Band Heater (McMaster 8160T21), and insulated by (1) alumina silica ceramic fiber ultra high insulation with an aluminum facing on one side (McMaster 9379K93) and (2) rigid thermal shock resistant ceramic insulation without binder (McMaster 9359K75). The temperature is monitored by a thermocouple and controlled by DIN Compact Temperature Controller (Omega CN2100-R20).

The full cell voltage to drive molten hydroxide electrolysis of wet $N_2$ or air to ammonia at 200° C. in the presence of nanoscopic $Fe_2O_3$ was 1.2 V when the applied current was 20 mA between the 10 $cm^2$ Ni electrodes, and increased to 1.4 V when the current was increased to 250 mA. In each case, when current was applied, the electrolysis potential rises from 0 V to 60% of the final voltage within the initial 30 seconds of electrolysis, and to 80% of the final potential within the first 5 minutes of the electrolysis. Ni, Pt and lithiated Ni were effective anodes. The lithiated Ni was prepared by anodization at 1 mA $cm^{-2}$ for 24 hours in 100° C. 3M LiOH, and drives the electrolysis at a ~0.07 V lower potential. However, in this study, commercial, pure (Ni 200) shim was employed as the anode to demonstrate ease of process. At these current densities and temperature, variation of the cation has not been observed to affect these electrolysis potentials. Higher current densities and higher temperature potential may be affected by the cation, which will affect electrolyte conductivity and water retention.

The product gas from the electrolysis chamber was bubbled (sparged) through an ammonia trap containing 500 mL doubly deionized water, changed regularly for ammonia analysis Ammonia concentration was determined by triple redundant methodologies (1) UV/vis absorption, (2) ion selective electrode analysis (Hach 2348700 Ammonia ISE Analysis package), and (3) ammonia test strips (Hach 2755325, dilution required on more concentrated samples). In each case, redundant measurements yielded similar ammonia measurements, with the observed reproducibility of first two methodologies ±2% and the test strips to ±5%. Initially, two water traps (in series) were used to assess whether all ammonia was collected by the first water trap. No ammonia was measured in the second water trap, even under high ammonia production conditions, and only a single water trap was used in subsequent experiments. A (single 500 mL) millimolar acid water trap was also effective. High ammonia concentrations required a dilution prior to analysis by the ammonia test strips. The ammonia ISE was calibrated with a series of $NHCl_4$ solutions, and 2 mL pH of ionic strength adjustor (Orion ISA 951210) added to 100 ml of analyte. The ammonia ISE responded quickly to moderate and high ammonia concentrations, however, it required several minutes to reach a limiting voltage (concentration) when analyzing dilute ammonia concentrations. Hence, UV/vis was the preferred method of analysis. The UV/vis ammonia determination was measured by absorption at 697 nm on a Perkin Elmer Lambda 35 UV/Vis spectrometer in a conventional 1 cm path length cuvette by the salicylic method, as calibrated with standard aqueous ammonium chloride ($NH_4Cl$) solutions. See Hellman et al., J. Phys. Chem., B,110, 17719-17735, 2006. Absorption was measured following the additions of 0.36 M salicylic acid ($C_6H_4(OH)COOH$) in 0.32 M aqueous NaOH, aqueous 0.032 sodium nitroprusside ($Na_2[Fe(CN)_5NO] \cdot 2H_2O$), and 0.1M sodium hypochlorite (NaClO) in 0.75 M aqueous NaOH.

$H_2$ was measured directly by a Micro IV hydrogen analyzer (GfG Instrumentation) or, in the case of high hydrogen concentrations, following serial dilution by added nitrogen. At lower $N_2$ inlet flow rates, $H_2$ was redundantly determined by the volume of $H_2$ & $O_2$ gas collected (after corrections for the partial volumes of $N_2$ and $H_2O_{vapor}$). $H_2$ was redundantly measured, along with $O_2$, by GC (HP 5890 series II gas chromatograph) with 3 mL/min argon flow using a Carboxen-1010 column, injecting a 250 μL sample, which yields $H_2$ and $O_2$ peaks respectively at 2.15 and 3.7 minutes.

Figure 4:
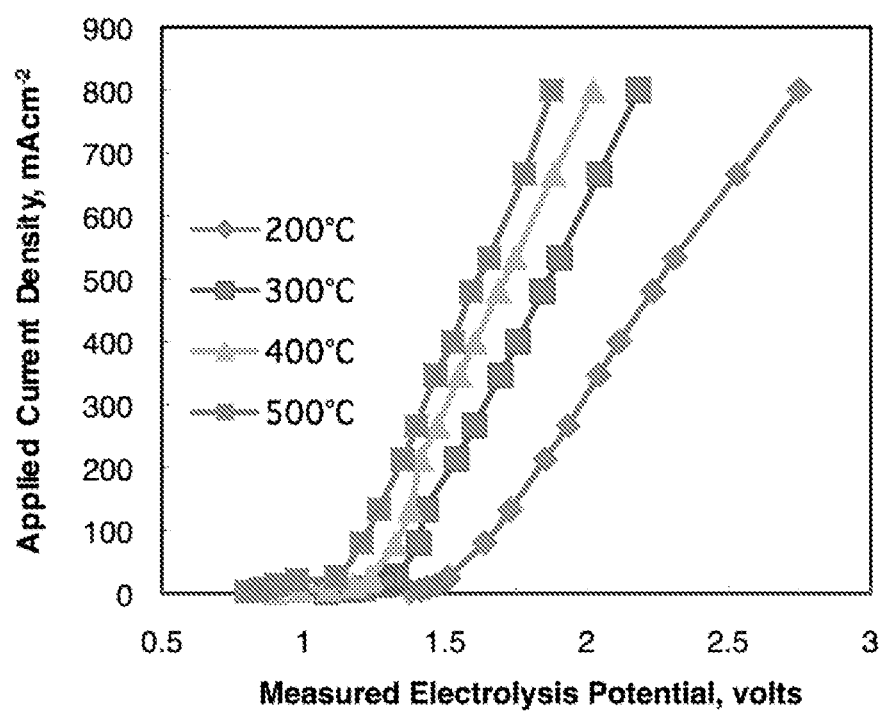
FIG. 4 shows the measured electrolysis potential at 200° C. of a 1:1 molar molten mix of NaOH and KOH at 1 atmosphere between two 2.5 by 1.5 cm planar nickel electrodes.

As measured at 200° C., the molten hydroxide electrolyzer efficiently splits water, bubbled in as steam. $H_2$ was produced at a 2:1 ratio to $O_2$ when the electrolyzer did not contain nitrogen or an effective ammonia generation surface. A range of LiOH, NaOH, KOH and CsOH eutectic mix electrolyzers (such as, for example a 1:1 molar ratio of NaOH to KOH) were effective for water electrolysis below 300° C. The pure alkali hydroxides each melt only at temperatures above 300° C. The 1:1 molar ratio of NaOH:KOH eutectic melts 170° C. At 200° C., this electrolyte approached 100% of the electrolysis efficiency for water splitting. The variation of the water splitting electrolysis voltage as a function of current density and temperature, at 1 atmosphere was measured between planar Ni electrodes and is presented in FIG. 4. Steam was bubbled into the cell to saturate each electrolyte with water. For example, the 200° C. molten 1:1 molar NaOH:KOH electrolyte contains approximately 8% weight water. At 200° C., the coulombic water splitting efficiency approaches 100% as measured for currents of 25 to 1000 mA $cm^{-2}$. Water splitting coulombic efficiency in the open air drops with increasing temperature, as the molten electrolyte dehydrates with increasing temperature. At 300° C., the coulombic efficiency dropped to 90%, and by 500° C. the coulombic efficiency has decreased to 25%. Measured potentials were 0.1 V lower when lithiated Ni anodes and monel mesh cathodes are used in lieu of planar nickel (29). Additionally, textured and/or alloyed electrodes and modifying the cell configuration may decrease the electrolysis voltage at higher water splitting current densities.

Experimentally, high rates of ammonia generation were observed when the 200° C. molten hydroxide (NaOH:KOH) electrolyte was mixed with $Fe_2O_3$ having a surface area greater than about 30 $m^2/g$ to provide iron as a reactive surface, and when nitrogen and water vapor were in the cell. The medium was electrolyzed between a planar nickel anode and a mesh nickel-monel cathode. In initial experiments, the $H_2$ evolving mesh cathode was used to enclose the iron oxide, but the mesh openings were too large to contain the nano-$Fe_2O_3$. Therefore, in subsequent experiments, nano-$Fe_2O_3$ was simply added to the electrolyte. Both water saturated nitrogen and $CO_2$-scrubbed air (bubbled through a 1 M NaOH solution to remove $CO_2$) yielded similar efficiencies of ammonia generation. In lieu of air, 99.999% nitrogen was saturated with water at room temperature by bubbling the nitrogen through doubly deionized water in-route to the electrolyzer. In contrast to the water splitting electrolysis, the efficiency of the ammonia by electrolysis was lower at higher current densities.

Ammonia by electrolysis refers to the global reaction of nitrogen, water and electrons to form ammonia (and oxygen), and the efficiency is calculated based on the moles of electrons consumed compared to the equivalents of ammonia ($3e^-/NH_3$) generated. This efficiency was over 30% at 20 mA through 10 $cm^2$ electrodes compared to ~7% at 250 mA. The conversion efficiency is not limited by the available hydrogen, but rather by the available surface area of the $Fe_2O_3$ to promote the nitrogen and hydrogen conversion to ammonia.

Figure 5:
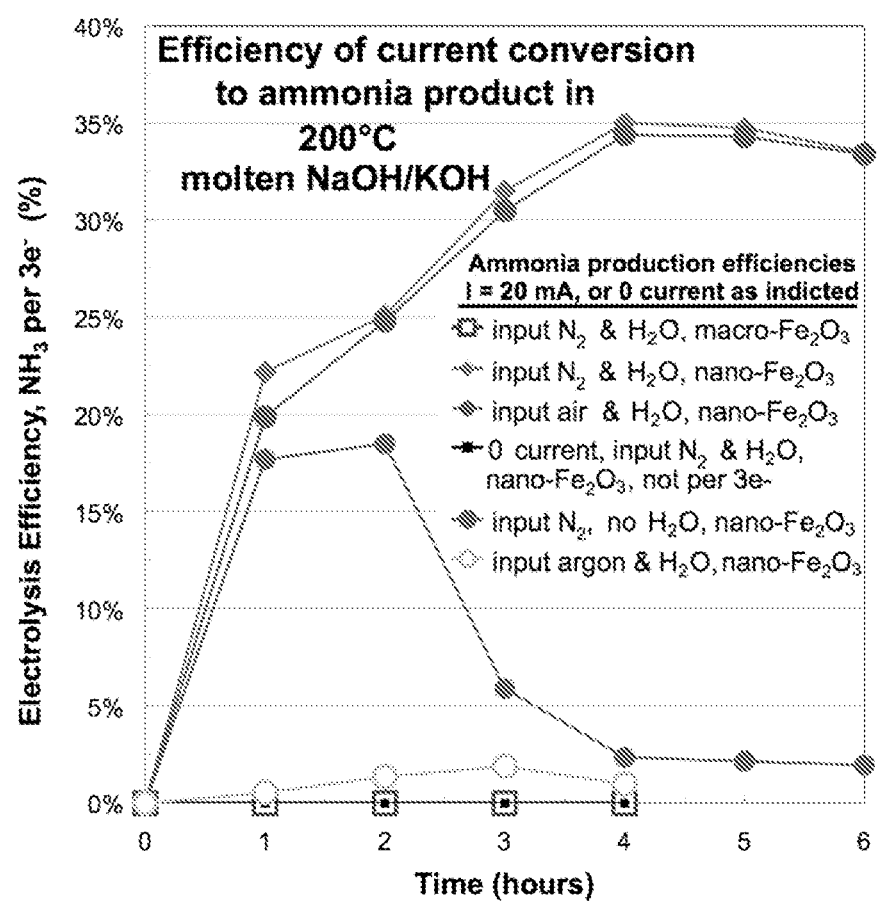
FIG. 5 shows the measured efficiency of ammonia evolution over time in a 200° C. 1:1 molar NaOH/KOH molten electrolyte under a variety conditions, including a constant current of either 0 or 20 mA between two 10 cm$^2$ nickel electrodes.

FIG. 5 shows the measured efficiency of ammonia evolution over time in a 200° C. 1:1 molar NaOH/KOH molten electrolyte under a variety conditions, including a constant current of either 0 or 20 mA between the 10 $cm^2$ Ni electrodes in the presence of nano or macro $Fe_2O_3$. Evolved ammonia was collected and measured in a room temperature water trap. The constant current of electrolysis was measured. The three electron equivalents of ammonia, measured as described herein, were divided by this integrated electrolysis charge to determine the electrolysis efficiency to synthesize ammonia. The electrolysis efficiency to produce ammonia was high, in excess of 30% using either wet air or wet nitrogen reactants and with nano-$Fe_2O_3$ to provide iron as a reactive surface.

The observed efficiency (>30%) for the conversion of electrons, air and water to ammonia compares to the highest values of less than 1% previously noted for the generation of ammonia from air or nitrogen and water (see Kordali et al., Chem. Comm., 1673-1674, 2000, Lan et al., Sci. Rep., 3, 1145, doi:10.1038/srep01145, 2013; and Lan et al., RSC Adv., 3, 18016-18021, 2013).

The cogeneration of $H_2$, as measured by a Micro IV hydrogen analyzer (GfG Instrumentation) is consistent with the remaining (approximately 65%) electrolysis current. At 20 mA applied current, the cogeneration of ammonia and hydrogen is consistent with the net reaction: $N_2+8H_2O \rightarrow 2NH_3+4O_2+6H_2$. The ratio of $H_2$ to $NH_3$ grows with increasing applied current.

As can be seen from FIG. 5, ammonia is not generated if current is not applied. As can also be seen from FIG. 5, the cell containing no $Fe_2O_3$, or macro-$Fe_2O_3$, rather than nanoscopic $Fe_2O_3$, did not generate discernible amounts of ammonia. The 20-40 nm $Fe_2O_3$ used remained colloidal throughout the electrolysis. In contrast, the conventional $Fe_2O_3$ (i.e., macro-$Fe_2O_3$) descended and collected at the bottom of the electrolysis cell. After milling conventional $Fe_2O_3$ at 300 rpm for two hours in a Retsch PM100 ball mill, discernible ammonia still was not generated during electrolysis and the $Fe_2O_3$ still collected at the bottom of the cell. However, ball milling at 600 rpm for two hours (which decreased the particle size to ~200 nanometers, resulted in a sustained colloidial suspension throughout electrolysis and generated a small, but discernible quantity of ammonia (~0.03 times the rate of the 20-40 nm $Fe_2O_3$ electrolysis cell). When the 20-40 nm $Fe_2O_3$ was placed above (in the headspace), rather than in the electrolyte, ammonia was not generated. Ammonia was also not generated when 20-40 nm $Fe_2O_3$ was first heated under argon to desorb any nitrogen, prior to its addition to the molten electrolyte, and when argon (saturated with water vapor), rather than nitrogen, was bubbled into the cell during the electrolysis. However, as seen from FIG. 5, when wet (water saturated) argon, rather than nitrogen was bubbled into the cell, and nano-$Fe_2O_3$ (without the desorption pretreatment) was added to the electrolyte, a low level of ammonia was initially generated until the nitrogen, presumably pre-adsorbed onto the nano-$Fe_2O_3$, was depleted.

Ammonia was also initially generated under conditions without water vapor in the nitrogen. However, as seen from FIG. 5, this ammonia production tapered off over time. This appears to be consistent with consumption of the molten hydroxide (M=alkali or alkali earth metal) as an alternate source of water:

$$2MOH \rightarrow M_2O+H_2O \qquad (9)$$

In accordance with Eq. 9, ammonia production continued until the molten hydroxide became dehydrated and oxide enriched.

The full cell voltage to drive molten hydroxide electrolysis of wet nitrogen or air to ammonia at 200° C. in the presence of nanoscopic $Fe_2O_3$ was 1.23 (±0.02) V when the applied current was 20 mA between the 10 $cm^2$ Ni electrodes (2 mA $cm^{-2}$) in the molten NaOH/KOH electrolyte. This increased to 1.44 (±0.02) V when the current increased to 250 mA (25 mA $cm^{-2}$), and then to 2.4 V for 2000 mA (200 mA $cm^{-2}$). At 2 mA $cm^{-2}$ under these conditions, ammonia evolved at a rate of $2.4 \times 10^{-9}$ mol $s^{-1}$ $cm^{-2}$ and hydrogen was co-synthesized at a rate of $6.6 \times 10^{-9}$ mol $s^{-1}$ $cm^{-2}$. At 25 mA $cm^{-2}$ the ammonia synthesis rate increased to $6.7 \times 10^{-9}$ mol $NH_3$ $s^{-1}$ $cm^{-2}$ and the rate of hydrogen co-production increased to $1.0 \times 10^{-7}$ mol $H_2$ $s^{-1}$ $cm^{-2}$. Hence, with increasing current density, the observed produced ratio of $H_2$ to $NH_3$ increased, i.e., the hydrogen co-production rate increased more rapidly than the ammonia production rate, and the global ($NH_3+H_2$) coulombic efficiency remained high at current densities of both 2 and 25 mA $cm^{-2}$. At the highest current density of 200 mA $cm^{-2}$, the ammonia production rate was $1.0 \times 10^{-8}$ mol $NH_3$ $s^{-1}$ $cm^{-2}$.

At 200° C. when the 1:1 NaOH:KOH electrolyte was replaced by a CsOH electrolyte (containing 30 wt % water to maintain the liquid/molten state at 200° C.) the 25 mA $cm^{-2}$ rate increased from $6.7 \times 10^{-9}$ to $7.1 \times 10^{-9}$ mol $NH_3$ $S^{-1}$ $cm^{-2}$. At the measured current densities and temperature, the variation of the electrolyte cation has not been observed to affect the electrolysis potentials. The same electrolysis potentials were observed when the equimolar NaOH/KOH molten electrolyte, was replaced by a 0.48:0.52 molar ratio NaOH/CsOH, a 0.7:0.3 molar ratio NaOH/LiOH, or a 0.7:0.3 molar ratio KOH/LiOH eutectic electrolyte.

The energy consumption of this ambient pressure process varies with rate (which affects the voltage) and the ammonia efficiency, or global current efficiency (including both ammonia and hydrogen). Hydrogen co-generated with the ammonia is not lost energy, and is available for storage, or use as a fuel or as a chemical reactant. As a first estimate of the energy consumption, we used the 1.2 V at 2 mA $cm^{-2}$ ($=2.4 \times 10^{-9}$ $cm^{-2}$ MJ $s^{-1}$). This produces $2.4 \times 10^{-9}$ $s^{-1}$ $cm^{-2}$ mol $NH_3$ ($=4.1 \times 10^{-11}$ $s^{-1}$ $cm^{-2}$ kg $NH_3$) and $6.6 \times 10$ $s^{-1}$ $cm^{-2}$ mol $H_2$ ($=1.3 \times 10^{-11}$ $s^{-1}$ $cm^{-2}$ kg $H_2$). Thus, 59 MJ is consumed per kg $NH_3$+0.3 kg $H_2$ produced. The energy content of the recovered $H_2$ is 120 to 142 MJ/kg (with/without the heat of water vaporization), and 0.3 kg $H_2$ comprises a recovered 36 to 43 MJ. This energy consumption estimate does not include the associated engineering losses, or the energy of heating to 200° C.

In the absence of the nano-$Fe_2O_3$, water is electrolyzed into hydrogen at the cathode and oxygen at the anode in the 200° C. molten hydroxide chamber. In the presence of nano-$Fe_2O_3$, two mechanisms for the ammonia synthesis can be postulated. In the first, electrochemical reduction of water to hydrogen occurs at the cathode, which then diffuses to react with adsorbed nitrogen on the nano-$Fe_2O_3$ surface to form ammonia. A second mechanism to consider is the electrochemical reduction of nitrogen and water at the nano-$Fe_2O_3$ to form ammonia. This latter mechanism necessitates electron transfer from the nickel cathode to the dispersed, electrolyte-suspended nano-$Fe_2O_3$.

This postulated second mechanism may be ruled out in the 200° C. molten hydroxide electrolyte with the high surface area $Fe_2O_3$, if ammonia is formed when no electrochemical current is applied in the case where $H_2$ and $N_2$ (as opposed to $H_2O$ and $N_2$) were added as chemical reactants. This situation would preclude the electrochemical reduction of nitrogen and water at the suspended $Fe_2O_3$, and yet facilitate ammonia formation. Little or no ammonia formed in the case when gas phase $H_2$ and $N_2$, with or without $O_2$, are introduced to the cell without a current. As one experiment, $H_2$ was used as the inlet reactant (with $O_2$, $N_2$ and $H_2O$). This was generated by room temperature electrolysis at 2000 mA in an aqueous solution of 4 m NaOH and 4 KOH. This generated gas, containing 2:1 $H_2$ to $O_2$ and forming 15 ml min$^{-1}$ of $H_2$, was mixed with 5 ml min$^{-1}$ of water saturated $N_2$ as the inlet gas. This converted the one-pot synthetic chamber into a two-pot chamber (in which hydrogen is formed by electrolysis in the preliminary room temperature pot and bubbled into the second molten electrolyte pot through the nickel tube and nickel mesh). In this case, ammonia was formed at a marginal, but discernible rate compared to that observed when the 2000 mA of current was applied directly to the 200° C. electrolysis chamber ($0.2 \times 10^{-9}$ versus $1.0 \times 10^{-8}$ mol $NH_3$ s$^{-1}$ cm$^{-2}$). As a second experiment, without any electrolysis, 15 mL/min pure $H_2$ and 5 mL/min pure $N_2$ gases were bubbled through water and used as the inlet gas. Again, ammonia was only formed at a marginal, but discernible rate ($0.2 \times 10^{-9}$ versus $1.0 \times 10^{-8}$ mol $NH_3$ s$^{-1}$ cm$^{-2}$). These experiments provide supporting evidence that the second mechanism (electrochemical reduction of the nitrogen and water at the nano-$Fe_2O_3$) of ammonia synthesis dominates. However, alternative factors, such as a (smaller, more reactive) $H_2$ bubble size for the in-situ generated (one-pot) versus ex-situ hydrogen may contribute to the lack of the observed reaction of gas phase hydrogen to ammonia.

During the last two hours of a 200° C. (NaOH:KOH) 6 hour 2 mA cm$^{-2}$ run, the ammonia production rate fell to 85% of its average value over the first 4 hours. Better mixing and excess nitrogen and water vapor significantly stabilized the rate. When the water-saturated nitrogen increased from 4 to 111 mL min$^{-1}$ (200° C. (NaOH:KOH) for 6 hours at the 20 mA applied current), the ammonia production fell only 3% (to 97% of the average rate over the first 6 hours).

As shown in FIG. 5, ammonia produced in the single chamber configuration is presented in Table 1. For the data shown in Table 1, $NH_3$ is the mg of measured $NH_3$ analyzed as detailed above. EE is the electrolysis efficiency, that is $NH_3/3e^-$ (%) calculated from the charge, q, and measured ammonia as: 100%*mol $NH_3/(q/3)$. In the case of q=0, EE=$NH_3$ (measured). Nano-$Fe_2O_3$ above the electrolyte (columns 14 & 15) was maintained in the headspace, and kept separate from the electrolyte by fiber alumina wool. Specifically, three cm above the molten electrolyte a platform was formed in the headspace of the electrolysis chamber which consisted of (i) Ni shim pierced with holes and covering the diameter of the alumina crucible, (ii) fine (400) 316 stainless mesh, and (iii) Cotronics 300 porous alumina paper with through holes for the alumina tubes covering the electrodes, (iv) then the nano-$Fe_2O_3$, (v) a top layer of Cotronics 300 porous alumina paper, and finally packed with (vi) high temperature fiber alumina wool (McMaster 9379K93 with foil-face removed).

TABLE 1

| Current: | I = 0 mA | I = 20 mA | macro-$Fe_2O_3$ | | nano $Fe_2O_3$ | | nano- $Fe_2O_3$ | | nano-$Fe_2O_3$ | | nano-$Fe_2O_3$ | | nano-$Fe_2O_3$, above, not in, electrolyte | | nano-$Fe_2O_3$ | |
|---|---|---|---|---|---|---|---|---|---|---|---|---|---|---|---|---|
| Additive: | Nan0-$Fe_2O_3$ | | | | | | | | | | | | | | | |
| Inlet gas: | Wet $N_2$ | | wet $N_2$ | | wet Ar | | wet Ar | | dry $N_2$ | | wet $N_2$ | | wet $N_2$ | | wet air | |
| Time (hr) | $NH_3$ | Q, Faraday | $NH_3$ | EE | $NH_3$ | EE | $NH_3$ | EE | $NH_3$ | EE | $NH_3$ | EE | $NH_3$ | EE | $NH_3$ | EE |
| 0 | 0 mg | 0.00E+00 | 0 mg | 0% | 0.00 | 0% | 0.00 | 0% | 0.00 | 0% | 0.00 | 0% | 0.00 | 0% | 0 | 0% |
| 1 | 0 mg | 7.46E-04 | 0 mg | 0% | 0.02 | 0.6% | 0.00 | 0% | 0.75 | 17.7% | 0.94 | 22.2% | 0.00 | 0% | 0.84 | 19.9% |
| 2 | 0 mg | 7.46E-04 | 0 mg | 0% | 0.06 | 1.4% | 0.00 | 0% | 0.78 | 18.5% | 1.06 | 25.1% | 0.00 | 0% | 1.05 | 24.8% |
| 3 | 0 mg | 7.46E-04 | 0 mg | 0% | 0.08 | 1.9% | 0.00 | 0% | 0.25 | 5.9% | 1.33 | 31.5% | 0.00 | 0% | 1.29 | 30.5% |
| 4 | 0 mg | 7.46E-04 | 0 mg | 0% | 0.04 | 1.0% | 0.00 | 0% | 0.10 | 2.4% | 1.48 | 35.0% | 0.00 | 0% | 1.46 | 34.4% |
| 5 | 0 mg | 7.46E-04 | 0 mg | 0% | | | | | 0.09 | 2.2% | 1.47 | 34.8% | | | 1.45 | 34.3% |
| 6 | 0 mg | 7.46E-04 | 0 mg | 0% | | | | | 0.08 | 2.0% | 1.42 | 33.5% | | | 1.41 | 33.4% |

Figure 6:
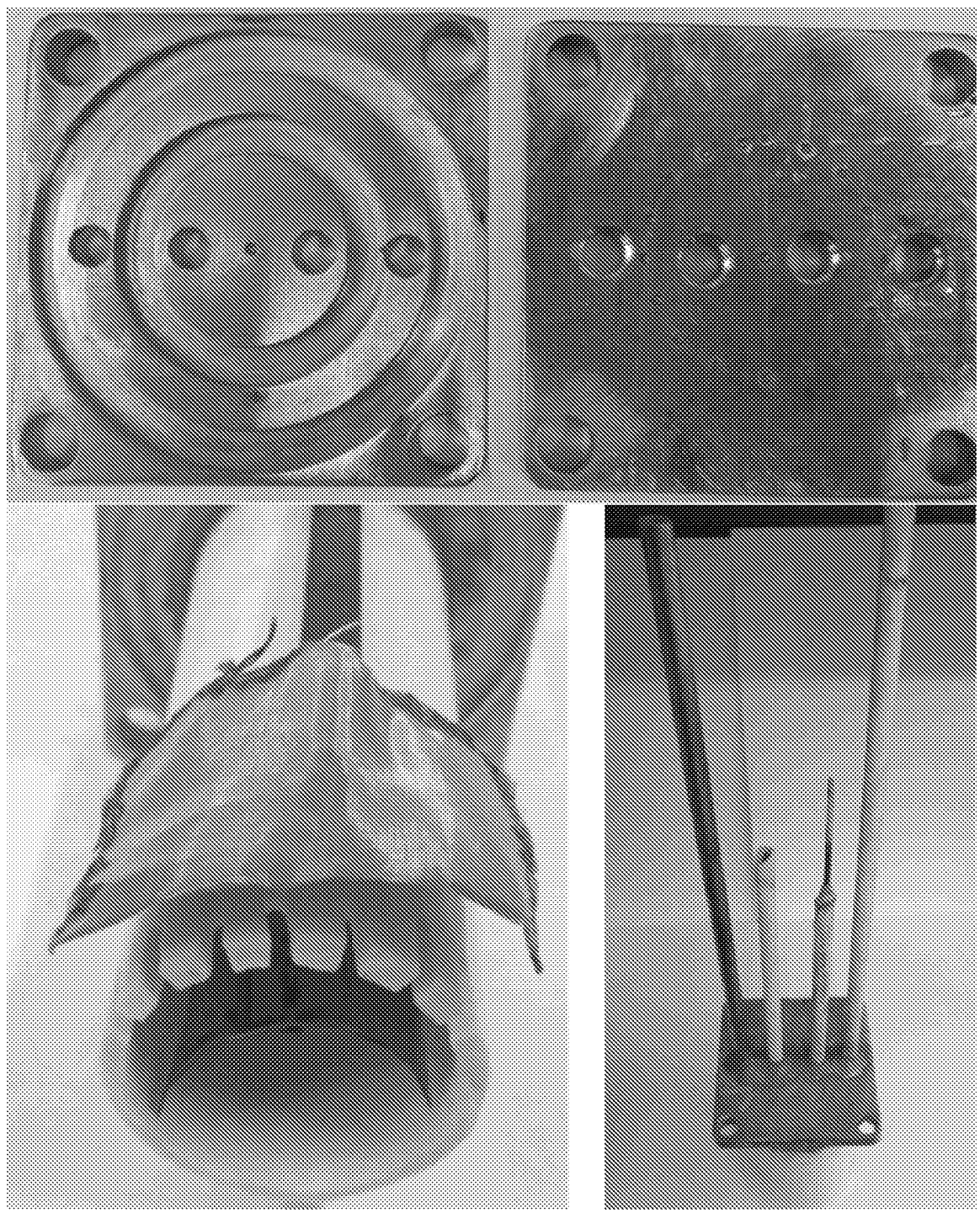
FIG. 6 shows a double chamber electrolysis cell configuration as described in the examples. Top left and right photos: underside and top of cell cover. Bottom photos, left: alumina tube with cathode outside and anode inside, prior to addition of electrolyte and outer crucible. Right: Double chamber cell prior to closure with bolts showing from right to left Inconnel tube for gas inlet & cathode electrical connection, outer chamber gas outlet, inner chamber electrical connection to anode, and inner chamber gas outlet.

A second, double chamber cell is shown in FIG. 6. An alumina crucible (not shown) sits in the outer groove of the cell cover, while an inner alumina tube sits in the inner groove. The outer chamber, situated between the crucible and the inner alumina tube contains an Inconnel tube (left side) which functions both as an inlet of water saturated air or nitrogen, and as an electrical connector for the nickel 400 mesh cathode. The outer chamber also contains an alumina tube outlet to one (of two) water traps for gas analysis. The inner chamber, situated within the alumina tube, contains the nickel anode connected externally by a nickel wire sheathed in an alumina tube, as well as a second alumina tube outlet to the second water trap for gas analysis. This configuration exhibits higher cell voltages due to the long electrolyte path between anode and cathode and was only used to confirm that ammonia was produced at the cathode and oxygen at the anode. While this configuration exhibits higher cell voltages, no improvement in efficiency (i.e. increase in ammonia produced) was observed in the experiments in which oxygen was partially (with air as the inlet gas) or fully (with nitrogen as the inlet gas) excluded from the cathode chamber. This suggests that there is no observable reaction of ammonia with oxygen in the 200° C. molten hydroxide electrolyte.

Figure 7:
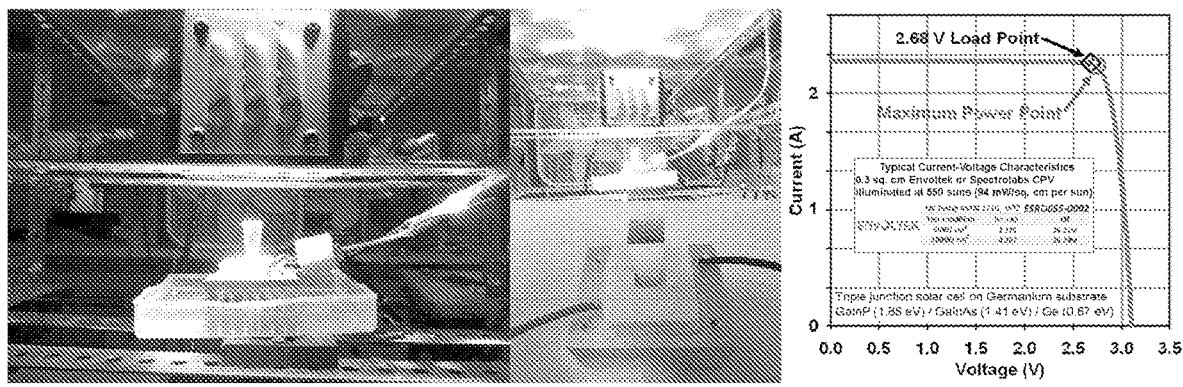
FIG. 7 shows the electrolyzer current power supply that can be used to drive the electrolysis cells of FIGS. 3, 6 and 9. The left side shows the 0.3074 cm$^2$ Envoltek ESRD055 CPV situated under the air-cooled AM1 filter. The middle top picture shows the fresnel concentrator above the AM 1 filter. The middle bottom picture shows the unattached CPC under the secondary optical concentrator. The right hand pictures shows a typical (550 sun) photocurrent–voltage plot of the CPV.

The electrolyzer current was supplied by power supply in initial experiments for the electrolysis cells shown in FIGS. 3, 6 and 9, and in later experiments by an efficient concentrator photovoltaic in lab under 1 kW Xenon, daylight color (5600K) AM1 (air mass) illumination, as shown in FIG. 7.

Ammonia Production Using Solar Thermal Constrained Volume Pressurization

A solar thermal water self-pressurizing, low electrolysis energy path system for the production of ammonia was also investigated. The solar generated high pressure of the reactant gas phase equilibrates with gas or molten phase reactants to decrease the electrochemical potential required for endothermic electrolyses. Sunlight provides the energy to evaporate a reactant in a constrained volume, driving the reactant to high pressure as shown (for $H_2O$) in FIG. 8 (alternatively, the higher pressure $H_2O$ can be used to compress a piston to pressurize a reactant such as $N_2$ in air). The sunlight also provides higher temperature, which further decreases the electrolysis splitting energy. Solar thermal energy is readily absorbed at conversion efficiencies in excess of 65% (see, e.g., Licht, *Adv. Mat.*, 47, 5592-5612, 2011; Pitz-Paal, High temperature Solar Concentrators in *Solar Energy Conversion and Photoenergy Systems*, (Eds. J. B. Galvez, S. M. Rodriguez) EOLSS Publishers, Oxford, UK, 2007; and Hahm, *Solar energy* 65, 33-41, 1999), and in the processes of the present invention may provide an efficient energy source and mechanism to maintain a high reactant pressure. Specifically, pure water or an NaOH:KOH electrolyte was enclosed with air and heated in a confined volume.

Figure 9:
FIG. 9 shows the high-pressure constrained cell used to measure saturated water pressure as a function of temperature. The Tech-zoom stainless steel reactor has an inner 200 ml Teflon chamber (top shown as used to measure saturated water pressure), and (bottom) is shown as in-house modified for electrolysis by replacement of the right-hand flow valve with throughput electrical contacts.

A 1:1 NaOH:KOH electrolyte system under $N_2$ gas system was heated with varying amounts of water in a 200 mL confined volume experimental cell (a modified hydrothermal reaction chamber), as shown in FIG. 9. The stainless steel reactor shown in FIG. 9 has an inner 200 mL Teflon chamber (top shown as used to measure saturated water pressure), and (bottom) is shown as in-house modified for electrolysis by replacement of the right-hand flow valve with throughput electrical contacts using an OMEGA MFT-116-3 Feedthrough for up to three $\frac{1}{16}$" diameter probes with a $\frac{1}{4}$" NPTM fitting.

Heating in a constrained volume evaporates water and provides an increase in water pressure from 0.03 bar at room temperature up to 60 bar at 275° C., thereby giving a concurrent decrease in the ammonia electrosynthesis potential in hydroxide electrolytes as ammonia is formed. The high water pressure generated is in accord with improved high Q/low ammonia energy synthesis conditions theoretically predicted by Eq. 7 and Eq. 8 above, as seen by the lower voltage curve (line #4) of FIG. 2. At 250° C. and 25 bar of steam pressure, the observed electrolysis potentials were 0.78 V, 1.01 V, and 1.31 V at 0.1, 2 and 25 mA cm$^{-2}$, respectively. These electrolysis potentials are 0.2 V more favorable than those observed at ambient pressure and 200° C. The measured 2 mA cm$^{-2}$ rate of ammonia synthesis of $2.4\times10^{-9}$ mol cm$^{-2}$ s$^{-1}$ at high pressure is similar to that observed at ambient pressure, but the co-production of $H_2$ is not observed at this lower potential.

Figure 8:
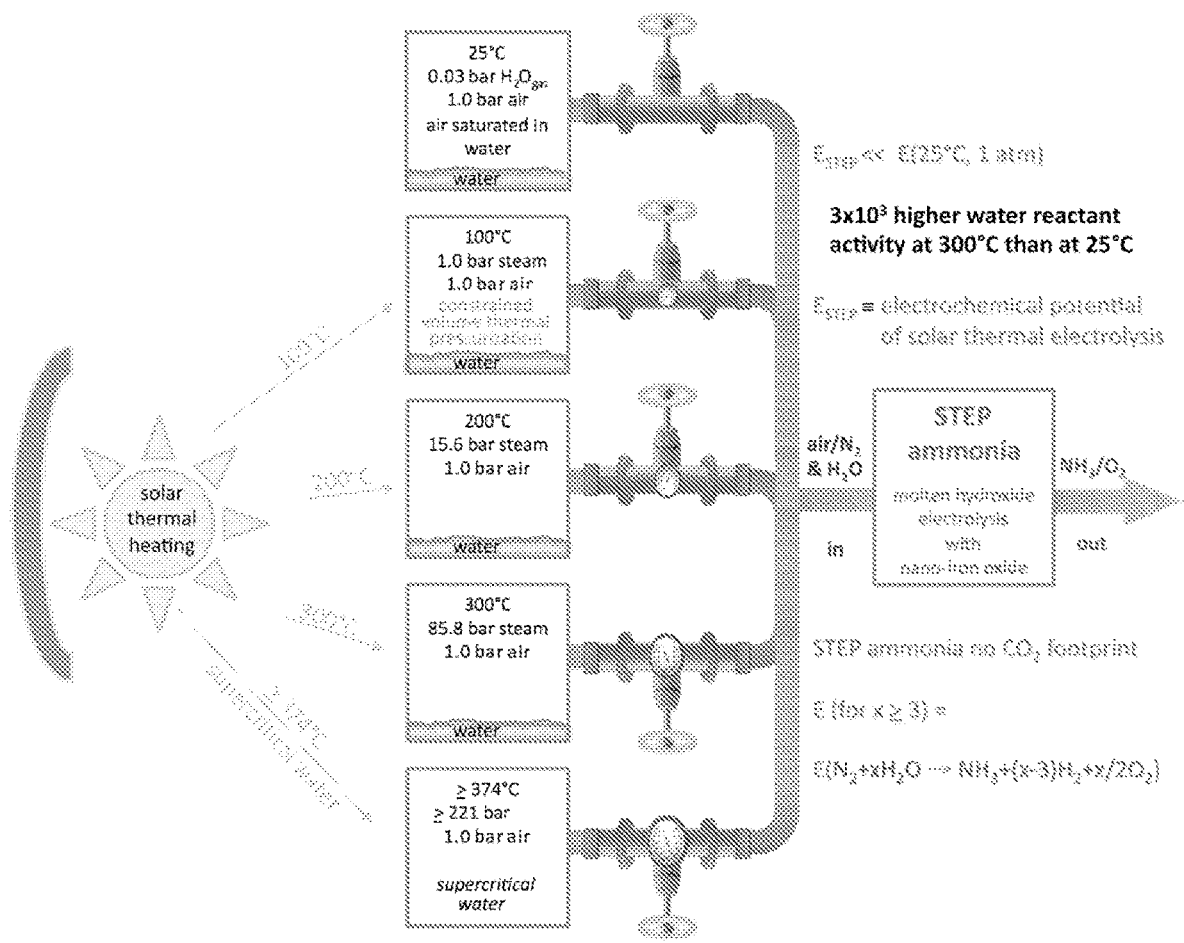
FIG. 8 shows the pressure of water saturating 1 bar of air, without or with solar heating in a constrained volume, as a feedstock for ammonia production.

In addition to water, as shown in FIG. 8, water/hydroxide mixtures in the modified hydrothermal reaction chamber of FIG. 9 were directly heated. Pure water in a constrained environment will achieve a pressure of 85.8 bar at 300° C. (see Appl, Ammonia 2. Production Processes, *Ullman's Encyclopedia of Industrial Processes*, DOI: 10.1002/14356007 (Wiley-Verlag, Germany 2012).

Figure 10:
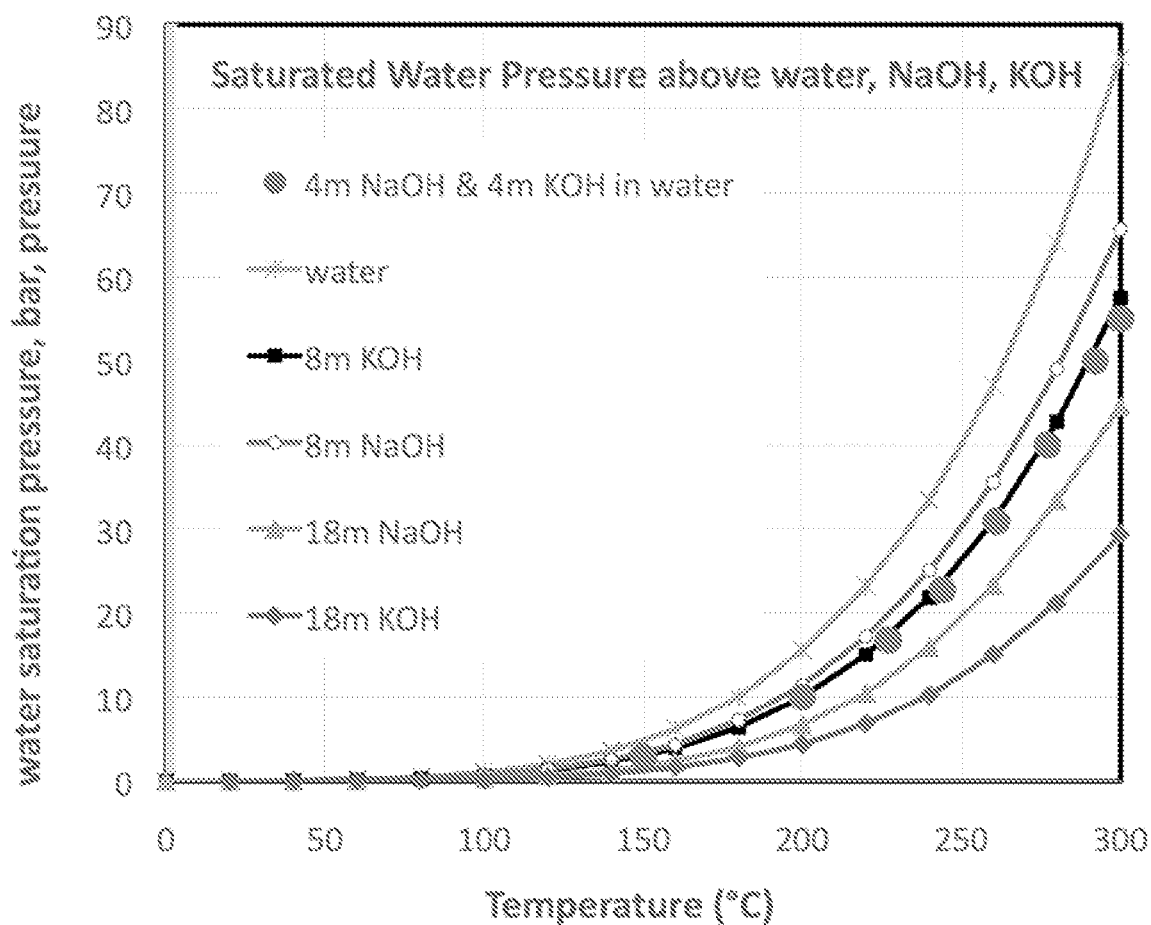
FIG. 10 shows the measured water pressure above a 4 molar NaOH+4 molar KOH aqueous solution (a mix containing a 1:1 molar ratio of NaOH to KOH and 72.2 mass percent water) compared to the experimental saturated water pressures above water, 8 m or 18 m NaOH, and 8 m or 18 m KOH.

As shown in FIG. 10, a KOH mix containing 50% water (an 18 m KOH aqueous solution) will achieve a pressure of 30 bar in a constrained environment (a substantial portion of the water is bound by the KOH). A 1:1 molar NaOH:KOH molten hydroxide mixture is a low melting point eutectic but at 1 bar retains relatively low concentrations of water (<8%) at 200° C. In order to achieve water-saturation pressures that can decrease the electrolysis energy, higher concentrations of water are required. As seen in FIG. 10, a 1:1 molar ratio of NaOH:KOH containing 67% water (an aqueous solution that is 4 molal in both NaOH and KOH) rises to a water pressure of over 50 bar when heated to 300° C. In comparison, as seen in FIG. 10, the variation with temperature of this saturated water pressure is similar, but slightly less, than that previously observed above pure 8 m NaOH or pure 8 m KOH solutions.

In principle, the heat required to raise the aqueous hydroxide mix is low (the heat capacity for water, NaOH and KOH varies from $C_p$=1 to 4 J g$^{-1}$ K$^{-1}$ with temperature). To safely constrain the pressure, the Teflon lined stainless steel 200 ml reaction chamber used in this study was large (5 kg) compared to the 70 g mass of the heated hydroxide solution, which provided a challenge to heating the chamber solely with solar energy. However, in order to demonstrate that solar thermal is sufficient, 60 to 70 g of an alkali eutectic salt consistently reached and sustained temperatures of 500-700° C., and 30 g reached over 700° C., using a 500 fold (Edmund Optics) Fresnel concentrated solar simulator (a collimated 1 kW xenon, daylight color (5600K) with Suntech Air Mass filter).

The temperature of the high-pressure cell shown in FIG. 9 was maintained at or below 300° C., as the decomposition temperature of Teflon is 325° C. We observed that the Teflon lining began to soften or deform at temperatures over 300° C. In accord with the scheme shown in FIG. 8, high water content, closed contained electrolyses provide an opportunity to increase the saturated water pressure above the molten phase reaction by three orders of magnitude by increasing the temperature from 25° C. to 300° C. These conditions provide the opportunity to explore the capability of solar thermal energy to decrease the electrolysis potential needed to drive water reactant electrolyses such in the ammonia synthesis reactions of Eqs. 4-8.

In experiments in the volume constrained cell with externally connected electrodes shown on the right side of FIG. 9, the potential between the Ni electrodes in an 8 m hydroxide ammonia synthesis electrolyte (4 m NaOH, 4 m KOH, nano-$Fe_2O_3$) decreases with increasing temperature, providing initial supporting evidence of the predicted high Q, low potential ammonia synthesis potential calculated in FIG. 2. Specifically at 250° C. and 25 bar pressure under volume constrained conditions using the cell of FIG. 9, measured electrolysis potentials are lower than those measured at atmospheric pressure and lower temperature, and the ammonia generation rate and current efficiency is higher. Measured potentials over the 10 cm$^2$ electrodes at higher temperature and pressure were 0.78 V at 1 mA, 1.01 V at 20 mA (compared to 1.23 V at ambient pressure and 200° C.), and 1.31 V at 250 mA (compared to 1.44 V at ambient pressure and 200° C.).

The cell was then maintained at 20 mA (2 mA cm$^{-2}$) for 10 hours and regularly (approximately every 2 hours) vented through a sparger/water trap to analyze for ammonia and the gas was analyzed for hydrogen. Compared to the 200° C., 1 atm. experimental results, the 250° C., 25 bar results require significantly lower electrolysis voltage, while coulombic efficiency and peak ammonia rate are the same 35% and $2.4\times10^{-9}$ mol $NH_3$ cm$^{-2}$ s$^{-1}$. No hydrogen co-product was detected during the course of the experiment. At 250° C. and 25 bar, the ammonia production rate varied with time as $2.1\times10^{-9}$ mol $NH_3$ cm$^{-2}$ s$^{-1}$ (hours 0 to 2.5), $2.2\times10^{-9}$ mol $NH_3$ cm$^{-2}$ s$^{-1}$ (hours 2.5 to 5), $2.4\times10^{-9}$ mol $NH_3$ cm$^{-2}$ s$^{-1}$ (hours 5 to 8), and then dropped to $1.6 \times 10^{-9}$ mol $NH_3$ $cm^{-2}$ $s^{-1}$ (hours 8 to 10). In each case, the pressure increased from 25 bar prior to venting. The cell was allowed to increase in pressure to 39 bar subsequent to the first vent/ammonia analysis, and then vented at 35 to 36 bar subsequently through 8 hours of electrolysis time. During hours 8 to 10, the rate of pressure build-up in the cell slowed and only increased from 25 to 28 bar during this two hour interval. Concurrent with the measured decrease in ammonia rate during this time interval was an increase in voltage (from 1.01 V to 1.11 V).

Using water evaporation in a closed container increases the electrolysis cell pressure. This induces a significant decrease in the energy (electrolysis voltage) measured to drive ammonia production. The lack of an observed hydrogen co-product at high pressure during ammonia synthesis at 2 mA $cm^{-2}$ represents a loss of this fuel as a co-product.

Optimization of the Ammonia Synthesis Process

Additional experiments were performed to optimize the processes described above in terms of improved rates, coulombic efficiency and stability of $NH_3$ production.

The efficiency, $\eta_{NH3}$, is calculated based on the moles of electrons consumed compared to the $3e^-/NH_3$ equivalents generated. In a 200° C. molten eutectic $Na_{0.5}K_{0.5}OH$ electrolyte, the 3 Faraday efficiency per mole of synthesized $NH_3$, $\eta_{NH3}$, increases with decreasing current density, and at $j_{electrolysis}$ of 200, 25, 2 and 0.7 mA $cm^{-2}$, $\eta_{NH3}$ is 1%, 7%, 37% and 71% respectively. Solar thermal can contribute to the energy to drive this synthesis. At 200 mA $cm^{-2}$, over 90% of applied current drives $H_2$, rather than $NH_3$, formation. Lower temperature supports greater electrolyte hydration. At 105° C. in the hydrated $Na_{0.5}K_{0.5}OH$ electrolyte, $\eta_{NH3}$ increases and then is observed to be highly stable at $\eta_{NH3}$=24 (+2) %.

The observed efficiency of ammonia formation by electrolysis was lower at higher current densities. At higher current densities, the electrolysis cogenerates $H_2$. At 200° C. in a eutectic $Na_{0.5}K_{0.5}OH$ electrolyte with suspended nano-$Fe_2O_3$, we observed at 2 mA $cm^{-2}$ that ammonia is produced at a coulombic efficiency of $\eta_{NH3}$=37% and decreases to 7% at 25 mA $cm^{-2}$. Constant current electrolysis at 2 or 25 mA $cm^{-2}$ is driven respectively at 1.2 or 1.4 V, producing ammonia at maximum rates respectively of $2.4 \times 10^{-9}$ and $6.7 \times 10^{-9}$ mol $NH_3$ $s^{-1}$ $cm^{-2}$.

Figure 11:
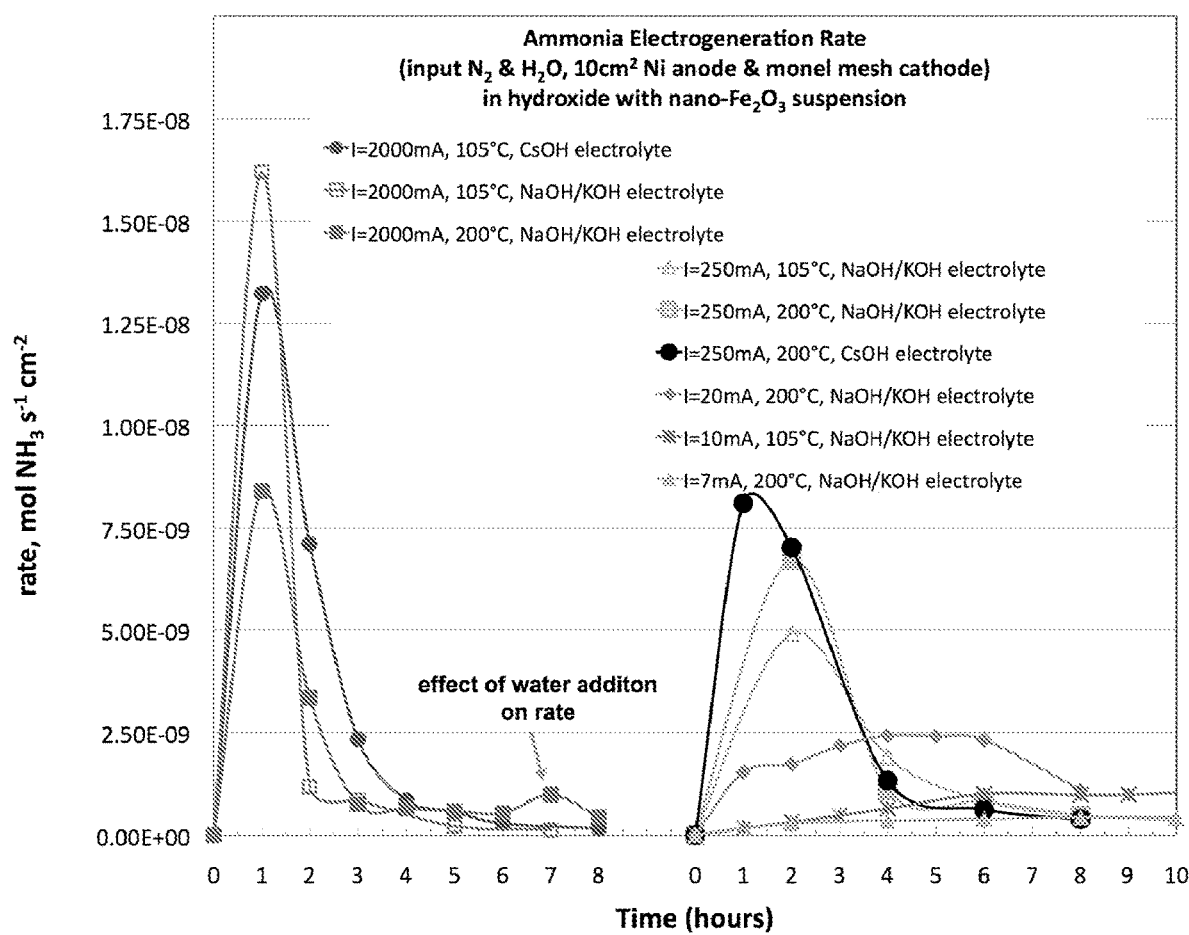
FIG. 11 shows the $NH_3$ formation rate by one-pot electrolysis from $N_2$ and $H_2O$ at currents of 2000, 250, 20, 10 and 7 mA in different electrolytes.

FIG. 11 shows the $NH_3$ formation rate by electrolysis from $N_2$ and $H_2O$ at currents of 2000, 250, 20, 10 and 7 mA in different electrolytes using a 10 $cm^2$ nickel anode and 10 $cm^2$ monel mesh cathode with suspended nano-$Fe_2O_3$.

The left side of FIG. 11 shows the observed rate of $NH_3$ formation at high current 2000 mA (200 mA $cm^{-2}$). At 200 mA $cm^{-2}$, $NH_3$ is formed at 2.4 V in molten $Na_{0.5}K_{0.5}OH$ with suspended nano-$Fe_2O_3$ at 200° C. The electrolysis is water limited, constrained by the maximum solubility of water (~10% by weight) in this molten hydroxide at 200° C. Despite bubbling water vapour saturated $N_2$ into the cell, the system dehydrates over time. As seen in FIG. 11, when water is added at the $7^{th}$ hour (15 g water was added to the initial 70 g of hydroxide electrolyte), the rate of $NH_3$ production doubles compared to that observed in hours 4 through 6. Another path to hydrate the system is by lowering the temperature, which supports higher dissolution of water in alkali hydroxide. At 105° C., the $NH_3$ synthesis was conducted in both 30% (by mass) water in $Na_{0.5}K_{0.5}OH$ and 50% water in CsOH. As can be seen in FIG. 11, the higher fraction of allowed water at 105° C. yields up to double the observed $NH_3$ generation rate compared to that observed at 200° C. At 105° C. and 200 mA $cm^{-2}$, $NH_3$ is formed at 2.5 and 2.3 V, respectively, in $Na_{0.5}K_{0.5}OH$ containing 30% water, or in CsOH containing 50% water.

As can be seen from the right side of FIG. 11, at the lowest applied current of 0.7 or 1 mA $cm^{-2}$ (7 or 10 mA over 10 $cm^2$), the $NH_3$ production rate is stabilized. At these current values, only $NH_3$, and no $H_2$, product was detected. The lack of a co-generated $H_2$ is related to the electrolysis potential, observed to be 1.2 V at 1 mA $cm^{-2}$ in the 105° C. $Na_{0.5}K_{0.5}OH$ with 30% water electrolyte. This value equals the thermodynamic potential of 1.2 V for water splitting at this temperature, and is too low to supply the additional overpotential that is necessary to drive the formation of hydrogen. At lower current, even at 200° C., the electrodes without activation, act in a sluggish manner and the observed efficiency ($\eta_{NH3}$) is 18% at 7 mA (0.7 mA $cm^{-2}$). However, when the electrodes are activated by a short burst of current, the maximum electrolysis rate of ammonia formation is significantly higher, specifically three fold higher subsequent to a 30 minute 250 mA current burst. In both the 15 and 30 minute current burst experiments (see FIG. 12), care was taken to flush the system (with $NH_3$ and no applied current) to ensure that all current burst ammonia produced was exhausted into the water trap prior before initiating electrolysis. The current efficiency of ammonia formation is 51% subsequent to a 15 minute 250 mA current burst, and the efficiency is 71% subsequent to a 30 minute 250 mA current burst. Without the current burst, or subsequent to the current burst, the electrolysis at a constant current of 7 mA occurs at 1 V in the 200° C. molten $Na_{0.5}K_{0.5}OH$ electrolyte and, unlike at higher applied current densities, $H_2$ is not co-generated with the $NH_3$ product. Specifically, the potential gradually rises from 1.00 to 1.04 during the first 8 hours of electrolysis and then increases gradually to 1.18 V by hour 20. Lower current density and lower temperature improve stability of the rate of $NH_3$ formation, and the rate subsequent to the shorter current burst is more stable than after the higher duration current boost. At 10 mA and 105° C., the $NH_3$ electrolysis efficiency increases over the first 5 hours (without current burst activation) and is nearly stable at 24 (+2%) over the next 15 hours of electrolysis.

The measured ammonia produced as a function of time, as shown on the right side of FIG. 11 during the 2000 mA electrolyses is provided in Table 2.

TABLE 2

| $I_{applied}$: 2000 mA q, Faraday During $\Delta$time | Electrolyte T(° C.) additive: Inlet gas: | Na/KOH 105° C. Nano-$Fe_2O_3$ Wet $N_2$ | | | | CsOH 105° C. Nano-$Fe_2O_3$ Wet $N_2$ | | | | Na/KOH 200° C. Nano-$Fe_2O_3$ Wet $N_2$ | | | |
|---|---|---|---|---|---|---|---|---|---|---|---|---|---|
| $\Delta$time = 1 hr | Time (hr) | $E_{electrolysis}$, V | $NH_3$, mg | $\eta NH3$ | EE | $E_{electrolysis}$, V | $NH_3$, mg | $\eta NH3$ | EE | $E_{electrolysis}$, V | $NH_3$, mg | $\eta NH3$ | EE |
| | 0 | 2.44 | 0.00 | 0 | 0 | 2.35 | 0 | 0 | 0.00% | 2.59 | 0.00 | 0 | 0.00% |
| 7.46E−02 | 1 | 2.44 | 9.94 | 1.6E−08 | 2.35% | 2.29 | 8.11 | 1.3E−08 | 1.91% | 2.49 | 5.15 | 8.4E−09 | 1.22% |
| 7.46E−02 | 2 | 2.43 | 0.73 | 1.2E−09 | 0.17% | 2.29 | 4.37 | 7.1E−09 | 1.03% | 2.50 | 2.06 | 3.4E−09 | 0.49% |
| 7.46E−02 | 3 | 2.43 | 0.53 | 8.6E−10 | 0.12% | 2.28 | 1.44 | 2.3E−09 | 0.34% | 2.50 | 0.46 | 7.5E−10 | 0.11% |

TABLE 2-continued

| | | | | | | | | | | | | | |
|---|---|---|---|---|---|---|---|---|---|---|---|---|---|
| 7.46E-02 | 4 | 2.42 | | | | 2.29 | 0.53 | 8.6E-10 | 0.12% | 2.49 | 0.40 | 6.5E-10 | 0.09% |
| 7.46E-02 | 5 | 2.42 | 0.27 | 2.2E-10 | 0.03% | 2.30 | 0.35 | 5.7E-10 | 0.08% | 2.52 | 0.36 | 5.9E-10 | 0.08% |
| 7.46E-02 | 6 | | | | | 2.31 | 0.18 | 2.9E-10 | 0.04% | 2.55 | 0.33 | 5.4E-10 | 0.08% |
| 7.46E-02 | 7 | 2.41 | 0.16 | 1.3E-10 | 0.02% | | | | | 2.50 | 0.61 | 9.9E-10 | 0.14% |
| 7.46E-02 | 8 | | | | | 2.32 | 0.20 | 1.6E-10 | 0.02% | 2.50 | 0.27 | 4.3E-10 | 0.06% |

The measured ammonia produced as a function of time, as shown on the left side of FIG. 11 during the 250 or 20 mA electrolyses is provided in Table 3.

TABLE 3

| $I_{applied}$: 250 mA q, Faraday During Δtime | Electrolyte T(° C.) additive: Inlet gas: | Na/KOH 105° C. Nano Fe$_2$O$_3$ Wet N$_2$ | | | | Na/KOH 200° C. Nano Fe$_2$O$_3$ Wet N$_2$ | | | |
|---|---|---|---|---|---|---|---|---|---|
| Δtime = 1 hr | Time (hr) | $E_{electrolysis}$, V | NH$_3$, mg | ηNH3 | EE | $E_{electrolysis}$, V | NH$_3$, mg | ηNH3 | EE |
| 0 | 0 | 1.78 | 0.00 | 0.0E+00 | 0.00% | 1.25 | 0.00 | 0.0E+00 | 0.00% |
| 9.33E-03 | 1 | | | | | | | | |
| 9.33E-03 | 2 | 1.85 | 6.03 | 4.9E-09 | 5.7% | 1.44 | 8.25 | 6.7E-09 | 0.00% |
| 9.33E-03 | 3 | | | | | | | | |
| 9.33E-03 | 4 | 1.99 | 2.34 | 1.9E-09 | 2.21% | 1.45 | 2.66 | 2.2E-09 | 0.00% |
| 9.33E-03 | 5 | | | | | | | | |
| 9.33E-03 | 6 | 1.92 | 1.04 | 8.4E-10 | 0.98% | 1.44 | 2.03 | 1.7E-09 | 0.00% |
| 9.33E-03 | 7 | | | | | | | | |
| 9.33E-03 | 8 | 1.89 | 0.59 | 4.8E-10 | 0.56% | 1.43 | 1.15 | 9.4E-10 | 0.00% |
| 9.33E-03 | 9 | | | | | | | | |
| 9.33E-03 | 10 | | | | | | | | |
| 9.33E-03 | 11 | 1.85 | 0.61 | 3.3E-10 | 0.38% | | | | |
| 9.33E-03 | 12 | | | | | | | | |
| 9.33E-03 | 13 | 1.81 | 0.31 | 2.5E-10 | 0.29% | | | | |
| 9.33E-03 | 14 | | | | | | | | |
| 9.33E-03 | 15 | 1.82 | 0.19 | 1.5E-10 | 0.18% | | | | |
| 9.33E-03 | 16 | | | | | | | | |
| 9.33E-03 | 17 | 1.83 | 0.11 | 8.6E-11 | 0.10% | | | | |
| 9.33E-03 | 18 | | | | | | | | |
| 9.33E-03 | 19 | 1.85 | 0.12 | 9.8E-11 | 0.11% | | | | |
| 9.33E-03 | 20 | | | | | | | | |

| $I_{applied}$: 250 mA q, Faraday During Δtime | CsOH 200° C. Nano Fe$_2$O$_3$ Wet N$_2$ | | | | q, Faraday During Δtime | Na/KOH 200° C. Nano Fe$_2$O$_3$ Wet N$_2$ | | | |
|---|---|---|---|---|---|---|---|---|---|
| Δtime = 1 hr | $E_{electrolysis}$, V | NH$_3$, mg | ηNH3 | EE | | $E_{electrolysis}$, V | NH$_3$, mg | ηNH3 | EE |
| 0 | 1.28 | 0.00 | 0.0E+00 | 0.00% | 0 | 1.02 | 0.00 | 0 | 0 |
| 9.33E-03 | 1.34 | 4.97 | 8.1E-09 | 9.4% | 7.46E-04 | 1.08 | 0.94 | 1.5E-09 | 22.2% |
| 9.33E-03 | 1.42 | 4.31 | 7.0E-09 | 8.1% | 7.46E-04 | 1.09 | 1.06 | 1.7E-09 | 25.1% |
| 9.33E-03 | | | | | 7.46E-04 | 1.10 | 1.34 | 2.2E-09 | 31.6% |
| 9.33E-03 | 1.48 | 3.27 | 2.7E-09 | 3.09% | 7.46E-04 | 1.11 | 1.49 | 2.4E-09 | 35.1% |
| 9.33E-03 | | | | | 7.46E-04 | 1.12 | 1.48 | 2.4E-09 | 34.8% |
| 9.33E-03 | 1.55 | 1.53 | 2.5E-09 | 1.44% | 7.46E-04 | 1.14 | 1.42 | 2.3E-09 | 33.6% |
| 9.33E-03 | 1.58 | 0.95 | 1.5E-09 | 0.90% | 7.46E-04 | 1.20 | 1.35 | 1.1E-09 | 16.0% |
| 9.33E-03 | | | | | 7.46E-04 | | | | |
| 9.33E-03 | | | | | 7.46E-04 | 1.23 | 1.04 | 8.5E-10 | 12.3% |
| 9.33E-03 | | | | | 7.46E-04 | | | | |
| 9.33E-03 | | | | | 7.46E-04 | 1.27 | 0.80 | 6.5E-10 | 9.4% |
| 9.33E-03 | | | | | | | | | |
| 9.33E-03 | | | | | | | | | |
| 9.33E-03 | | | | | | | | | |
| 9.33E-03 | | | | | | | | | |
| 9.33E-03 | | | | | | | | | |
| 9.33E-03 | | | | | | | | | |
| 9.33E-03 | | | | | | | | | |

Figure 12:
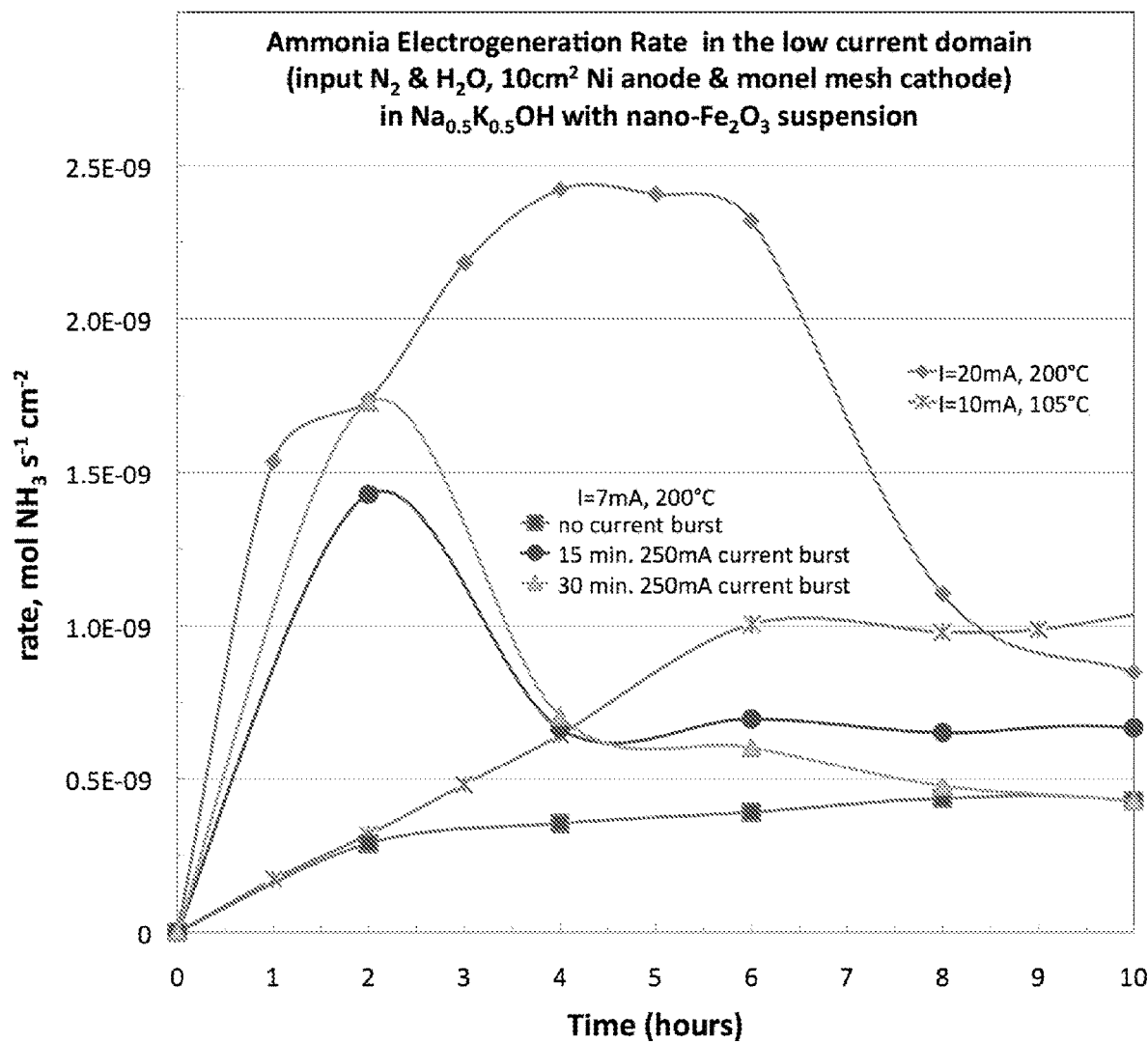
FIG. 12 shows the (charge) efficiency, $\eta_{NH3}$, of ammonia formed by electrolysis of $N_2$ and $H_2O$ in suspensions of nano-$Fe_2O_3$ in molten $Na_{0.5}K_{0.5}H$ electrolytes.

The measured ammonia produced as a function of time, as shown on the left side of FIGS. 11 and 12 during either 10 mA or 7 mA electrolyses is provided in Table 4.

TABLE 4

| $I_{applied}$: 10 mA q, Faraday During Δtime | Electrolyte T(°C) additive: Inlet gas: | Na/KOH 105°C Nano $Fe_2O_3$ Wet $N_2$ | | | |
|---|---|---|---|---|---|
| Δtime = 1 hr | Time (hr) | $E_{electrolysis}$, V | $NH_3$, mg | $\eta NH3$ | EE |
| 0 | 0 | 1.22 | 0.00 | 0.0E+10 | 0 |
| 3.73E−04 | 1 | 1.21 | 0.11 | 1.7E−10 | 5.0% |
| 3.73E−04 | 2 | 1.21 | 0.20 | 3.2E−10 | 9.2% |
| 3.73E−04 | 3 | 1.21 | 0.30 | 4.8E−10 | 13.9% |
| 3.73E−04 | 4 | 1.21 | 0.40 | 6.4E−10 | 18.6% |
| 3.73E−04 | 5 | | | | |
| 3.73E−04 | 6 | 1 22 | 1.23 | 1.0E−09 | 29.0% |
| 3.73E−04 | 7 | | | | |
| 3.73E−04 | 8 | 1.23 | 0.60 | 9.8E−10 | 28.3% |
| 3.73E−04 | 9 | 1.23 | 0.61 | 9.9E−10 | 28.6% |
| 3.73E−04 | 10 | | | | |
| 3.73E−04 | 11 | | | | |
| 3.73E−04 | 12 | 1.23 | 2.01 | 1.1E−09 | 31.6% |
| 3.73E−04 | 13 | | | | |
| 3.73E−04 | 14 | | | | |
| 3.73E−04 | 15 | | | | |
| 3.73E−04 | 16 | 1.25 | 2.26 | 9.2E−10 | 26.7% |
| 3.73E−04 | 17 | | | | |
| 3.73E−04 | 18 | | | | |
| 3.73E−04 | 19 | | | | |
| 3.73E−04 | 20 | 1.26 | 2.10 | 8.6E−10 | 24.8% |

| $I_{applied}$: 7 mA q, Faraday During Δtime | Na/KOH 200°C Nano $Fe_2O_3$ Wet $N_2$ | | | |
|---|---|---|---|---|
| Δtime = 1 hr | $E_{electrolysis}$, V | $NH_3$, mg | $\eta NH3$ | |
| 0 | 0.88 | 0.00 | 0.0E+00 | |
| 2.61E−04 | | | | |
| 2.61E−04 | 1.00 | 0.36 | 2.9E−10 | |
| 2.61E−04 | | | | |
| 2.61E−04 | 1.01 | 0.44 | 3.5E−10 | |
| 2.61E−04 | | | | |
| 2.61E−04 | 1.02 | 0.48 | 3.9E−10 | |
| 2.61E−04 | | | | |
| 2.61E−04 | 1.03 | 0.54 | 4.4E−10 | |
| 2.61E−04 | | | | |
| 2.61E−04 | 1.04 | 0.53 | 4.3E−10 | |
| 2.61E−04 | | | | |
| 2.61E−04 | | | | |
| 2.61E−04 | | | | |
| 2.61E−04 | | | | |
| 2.61E−04 | | | | |
| 2.61E−04 | | | | |
| 2.61E−04 | | | | |
| 2.61E−04 | | | | |
| 2.61E−04 | | | | |

| $I_{applied}$: 10 mA q, Faraday During Δtime | Na/KOH 200°C Nano $Fe_2O_3$ Wet $N_2$ | 15 min i burst | | | | Na/KOH 200°C Nano $Fe_2O_3$ Wet $N_2$ | 30 min i burst | | |
|---|---|---|---|---|---|---|---|---|---|
| Δtime = 1 hr | EE | $E_{electrolysis}$, V | $NH_3$, mg | $\eta NH3$ | EE | $E_{electrolysis}$, V | $NH_3$, mg | $\eta NH3$ | EE |
| 0 | 0.00% | 1.25 | 0.00 | 0.0E+00 | 0.00% | 1.28 | 0.00 | 0.0E+00 | 0.00% |
| 3.73E−04 | 12.0% | 1.00 | 1.75 | 1.4E−09 | 59.0% | 1.14 | 2.12 | 1.7E−09 | 71.5% |
| 3.73E−04 | 14.7% | 1.01 | 0.82 | 6.6E−10 | 27.5% | 1.12 | 0.87 | 7.1E−10 | 29.2% |
| 3.73E−04 | 16.2% | 1.03 | 0.86 | 7.0E−10 | 28.8% | 1.18 | 0.74 | 6.0E−10 | 25.0% |
| 3.73E−04 | 18.0% | 1.04 | 0.80 | 6.5E−10 | 27.0% | 1.20 | 0.59 | 4.8E−10 | 19.7% |
| 3.73E−04 | 17.7% | 1.13 | 0.82 | 6.7E−10 | 27.7% | 1.21 | 0.53 | 4.3E−10 | 17.7% |
| 3.73E−04 | | | | | | | | | |
| 3.73E−04 | | | | | | | | | |
| 3.73E−04 | | 1.16 | 1.30 | 5.3E−10 | 21.9% | | | | |
| 3.73E−04 | | | | | | 1.12 | 0.99 | 2.7E−10 | 11.1% |
| 3.73E−04 | | 1.20 | 0.75 | 4.1E−10 | 16.9% | | | | |
| 3.73E−04 | | | | | | | | | |
| 3.73E−04 | | 1.17 | 0.68 | 3.7E−10 | 15.2% | | | | |

Without an applied electrolysis current, no significant chemical reaction is observed to occur between either $N_2$ and $H_2$, or between $N_2$ and $H_2O$ in the presence of $Fe_2O_3$.

Iron metal powder, $N_2$ and $H_2O$ chemically react to form $NH_3$, with the reaction accelerating with decreasing Fe particle size. Water saturated $N_2$ was bubbled into 200°C molten $Na_{0.5}K_{0.5}OH$ electrolyte containing either approx. 70 μm, 1-3 μm, or 10-30 nm Fe powder. When using approx. 70 μm Fe metal powder, $NH_3$ was formed at a rate of $3.4 \times 10^{-7}$ mol $NH_3$ hour$^{-1}$ per g of the Fe powder during the first 2 hours, decreasing to $0.87 \times 10^{-7}$ after 14 hours. When using 1-3 μm Fe metal powder, the $NH_3$ formation rate was $3.6 \times 10^{-5}$ mol $NH_3$ hour$^{-1}$ per g during the first 2 hours decreasing to $0.21 \times 10^{-5}$ after 16 hours, and to $0.0054 \times 10^{-5}$ after 26 hours. When using 10-30 nm Fe metal powder, the reaction was too fast and violent to be measured, forcing molten electrolyte into the gas outlet of the reaction chamber.

The experimental observations described herein are consistent with an ammonia formation mechanism in alkali hydroxide media in which the iron oxide is reduced at the cathode, and chemically reacts with the $N_2$ and water according to equations (i), (ii), (iii) and (iv):

$$\text{cathode: } Fe_2O_3 + 3H_2O + 6e^- \rightarrow 2Fe + 6OH^- \quad \text{(i)}$$

$$\text{chemical: } 2Fe + 3H_2O + N_2 \rightarrow 2NH_3 + Fe_2O_3 \quad \text{(ii)}$$

$$\text{anode: } 6OH^- \rightarrow 3/2 O_2(g) + 3H_2O + 6e^- \quad \text{(iii)}$$

$$\text{net: } N_2 + 3H_2O \rightarrow 2NH_3 + 3/2 O_2 \quad \text{(iv)}.$$

In the chemical reaction of Eq. (ii), iron is oxidized to the oxide product ($Fe_2O_3$) and donates electrons to $N_2$ (in the presence of water) rather than to $O_2$. This minimization of oxygen, compared to nitrogen, reduction reactivity is consistent with the high solubility and concentration of $H_2O$ relative to $O_2$ in this hydroxide media. Only in cases of dehydrated molten hydroxide electrolytes is evidence of significant $O_2$ reduction observed. This latter case is exemplified with simple water splitting in molten hydroxide media (without the presence of iron). At temperatures less than 300° C., the coulombic efficiency for $H_2$ formation from water in a range of alkali hydroxides approaches 100%, consistent with the preferential reduction of water, rather than oxygen, at the cathode:

$$2H_2O + 2e^- \rightarrow H_2 + 2OH^- \quad (5)$$

However, at temperatures greater than 300° C., the coulombic efficiency of $H_2$ formation rapidly falls with increasing temperature as the electrolyte dehydrates. A lack of water increases the parasitic competition from the cathode side reactions, which, rather than forming $H_2$, form superoxide from $O_2$, and hydroxide from superoxide:

$$\text{cathode side reactions: } O_2 + e^- \rightarrow O_2^-$$

$$O_2^- + 2H_2O + 3e^- \rightarrow 4OH^-$$

At high current densities (at temperatures less than 300° C. and in the presence of iron), water splitting and the iron cathodic reaction run concurrently to cogenerate $H_2$ and $NH_3$ (and anodic $O_2$). At low current densities (at potentials less than or equal to the water splitting potential), only the iron cathodic reaction (i) contributes to the electrolysis. In this case $NH_3$ and not $H_2$ is formed. Above the water splitting potential the global reaction also forms $zH_2$ from $2NH_3 + zH_2$ using (6+2z) electrons, in the presence of nano-$Fe_2O_3$:

$$N_2 + (3+z)H_2O \rightarrow 2NH_3 + zH_2 + (3+z)/2 O_2$$

Consistent with equations (i), (ii), (iii) and (iv), ammonia is alternatively formed with dissolved, rather than solid iron oxide. Specifically, when iron oxide is dissolved in a solubilizing molten electrolyte such as lithium carbonate, or a mixture of lithium carbonate with other added salts, the iron oxide is electrochemically reduced at a cathode to form iron metal, and the iron metal chemically reacts with added water and air to form iron oxide and ammonia products. The iron oxide product is again electrochemically reduced to allow for the continued formation of ammonia with added water and air.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as described above. It is intended that the appended claims define the scope of the invention and that methods and structures within the scope of these claims and their equivalents be covered thereby.

All publications, patents and patent applications cited in this application are herein incorporated by reference to the same extent as if each individual publication, patent or patent application was specifically and individually indicated to be incorporated herein by reference.

What is claimed is:

1. A process for the production of ammonia comprising electrolysis of air and water between an anode and a cathode in a molten hydroxide electrolyte or an aqueous hydroxide electrolyte, the electrolyte comprising iron or an iron oxide, wherein the iron or iron oxide has (i) a Brunauer-Emmett-Teller surface area greater than about 10 m²/g and/or (ii) an average particle size of less than about 5000 nm, wherein the process is conducted above the supercritical point of water, and wherein the molten hydroxide electrolyte or the aqueous hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

2. The process of claim 1, wherein carbon dioxide is not formed during the process.

3. The process according to claim 1, wherein the molten hydroxide electrolyte or the aqueous hydroxide electrolyte is selected from alkali metal hydroxides, alkali earth metal hydroxides, and any combination thereof.

4. The process according to claim 1, wherein the molten hydroxide electrolyte or the aqueous hydroxide electrolyte is selected from lithium hydroxide, sodium hydroxide, potassium hydroxide, cesium hydroxide, and any combination thereof.

5. The process according to claim 1, wherein the molten hydroxide electrolyte or the aqueous hydroxide electrolyte comprises sodium hydroxide and potassium hydroxide.

6. The process according to claim 5, wherein the molar ratio of sodium hydroxide to potassium hydroxide is about 1:1.

7. The process according to claim 1, wherein the melting point of the molten hydroxide electrolyte or the aqueous hydroxide electrolyte is between about 25° C. and about 300° C.

8. The process according to claim 1, wherein the electrolysis is conducted at an applied current density of between about 0.5 mA cm⁻² and about 2000 mA cm⁻².

9. The process according to claim 1, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

10. The process according to claim 1, wherein the anode and cathode both comprise nickel.

11. The process according to claim 1, wherein the process is conducted at a nitrogen gas partial pressure of between about 1 bar and about 100 bar.

12. The process according to claim 1, wherein the chemistry of the process can be expressed by equations (i), (ii), (iii) and (iv):

$$\text{cathode: } Fe_2O_3 + 3H_2O + 6e^- \rightarrow 2Fe + 6OH^- \quad \text{(i)}$$

$$\text{chemical: } 2Fe + 3H_2O + N_2 \rightarrow 2NH_3 + Fe_2O_3 \quad \text{(ii)}$$

anode: $6OH^- \rightarrow 3/2 O_2(g) + 3H_2O + 6e^-$     (iii)

net: $N_2 + 3H_2O \rightarrow 2NH_3 + 3/2O_2$     (iv).

13. The process according to claim 1, wherein the melting point of the molten hydroxide electrolyte is between about 100° C. and about 300° C.

14. The process according to claim 1, wherein the melting point of the molten hydroxide electrolyte is between about 150° C. and about 250° C.

15. The process according to claim 1, wherein the electrolysis is conducted at an applied current density of between about 0.5 mA cm$^{-2}$ and about 200 mA cm$^{-2}$.

16. The process according to claim 1, wherein the iron or iron oxide has an average particle size less than about 200 nm.

17. The process according to claim 1, wherein the melting point of the molten hydroxide electrolyte is about 170° C., about 195° C., about 200° C., about 215° C. or about 225° C.

18. The process according to claim 1, wherein the aqueous hydroxide electrolyte has a molality between about 8 m and about 18 m.

19. A process for the production of ammonia comprising electrolysis of air and water between an anode and a cathode in a molten hydroxide electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted above the supercritical point of water.

20. The process of claim 19, wherein carbon dioxide is not formed during the process.

21. The process according to claim 19, wherein the molten hydroxide electrolyte is selected from alkali metal hydroxides, alkali earth metal hydroxides, and any combination thereof.

22. The process according to claim 19, wherein the molten hydroxide electrolyte is selected from lithium hydroxide, sodium hydroxide, potassium hydroxide, cesium hydroxide, and any combination thereof.

23. The process according to claim 19, wherein the molten hydroxide electrolyte comprises sodium hydroxide and potassium hydroxide.

24. The process according to claim 23, wherein the molar ratio of sodium hydroxide to potassium hydroxide is about 1:1.

25. The process according to claim 19, wherein the molten hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

26. The process according to claim 19, wherein the melting point of the molten hydroxide electrolyte is between about 25° C. and about 300° C.

27. The process according to claim 19, wherein the electrolysis is conducted at an applied current density of between about 0.5 mA cm$^{-2}$ and about 2000 mA cm$^{-2}$.

28. The process according to claim 19, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

29. The process according to claim 19, wherein the anode and cathode both comprise nickel.

30. The process according to claim 19, wherein the process is conducted at a nitrogen gas partial pressure of between about 1 bar and about 100 bar.

31. The process according to claim 19, wherein the chemistry of the process can be expressed by equations (i), (ii), (iii) and (iv):

cathode: $Fe_2O_3 + 3H_2O + 6e^- \rightarrow 2Fe + 6OH^-$     (i)

chemical: $2Fe + 3H_2O + N_2 \rightarrow 2NH_3 + Fe_2O_3$     (ii)

anode: $6OH^- \rightarrow 3/2 O_2(g) + 3H_2O + 6e^-$     (iii)

net: $N_2 + 3H_2O \rightarrow 2NH_3 + 3/2O_2$     (iv).

32. The process according to claim 19, wherein the process is conducted at a pressure of between about 50 bar and about 221 bar pressure water vapor.

33. The process according to claim 19, wherein the process is conducted at a pressure of between about 100 bar and about 10,000 bar pressure of nitrogen gas.

34. The process according to claim 19, wherein the melting point of the molten hydroxide electrolyte is between about 100° C. and about 300° C.

35. The process according to claim 19, wherein the melting point of the molten hydroxide electrolyte is between about 150° C. and about 250° C.

36. The process according to claim 19, wherein the electrolysis is conducted at an applied current density of between about 0.5 mA cm$^{-2}$ and about 200 mA cm$^{-2}$.

37. The process according to claim 19, wherein the iron or iron oxide has an average particle size less than about 200 nm.

38. The process according to claim 19, wherein the melting point of the molten hydroxide electrolyte is about 170° C., about 195° C., about 200° C., about 215° C. or about 225° C.

39. A process for the production of ammonia comprising electrolysis of air and water between an anode and a cathode in a molten hydroxide electrolyte or an aqueous hydroxide electrolyte, the electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a water vapor partial pressure of between about 50 bar and about 221 bar, and wherein the molten hydroxide electrolyte or the aqueous hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

40. The process of claim 39, wherein carbon dioxide is not formed during the process.

41. The process according to claim 39, wherein the molten hydroxide electrolyte or the aqueous hydroxide electrolyte is selected from alkali metal hydroxides, alkali earth metal hydroxides, and any combination thereof.

42. The process according to claim 39, wherein the molten hydroxide electrolyte or the aqueous hydroxide electrolyte is selected from lithium hydroxide, sodium hydroxide, potassium hydroxide, cesium hydroxide, and any combination thereof.

43. The process according to claim 39, wherein the molten hydroxide electrolyte or the aqueous hydroxide electrolyte comprises sodium hydroxide and potassium hydroxide.

44. The process according to claim 43, wherein the molar ratio of sodium hydroxide to potassium hydroxide is about 1:1.

45. The process according to claim 39, wherein the melting point of the molten hydroxide electrolyte or the aqueous hydroxide electrolyte is between about 25° C. and about 300° C.

46. The process according to claim 39, wherein the electrolysis is conducted at an applied current density of between about 0.5 mA cm$^{-2}$ and about 2000 mA cm$^{-2}$.

47. The process according to claim 39, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

48. The process according to claim 39, wherein the anode and cathode both comprise nickel.

49. The process according to claim 39, wherein the process is conducted at a nitrogen gas partial pressure of between about 1 bar and about 100 bar.

50. The process according to claim 39, wherein the chemistry of the process can be expressed by equations (i), (ii), (iii) and (iv):

$$\text{cathode: } Fe_2O_3 + 3H_2O + 6e^- \rightarrow 2Fe + 6OH^- \quad (i)$$

$$\text{chemical: } 2Fe + 3H_2O + N_2 \rightarrow 2NH_3 + Fe_2O_3 \quad (ii)$$

$$\text{anode: } 6OH^- \rightarrow 3/2 O_2(g) + 3H_2O + 6e^- \quad (iii)$$

$$\text{net: } N_2 + 3H_2O \rightarrow 2NH_3 + 3/2 O_2 \quad (iv)$$

51. The process according to claim 39, wherein the process is conducted above the supercritical point of water.

52. The process according to claim 39, wherein the melting point of the molten hydroxide electrolyte is between about 100° C. and about 300° C.

53. The process according to claim 39, wherein the melting point of the molten hydroxide electrolyte is between about 150° C. and about 250° C.

54. The process according to claim 39, wherein the electrolysis is conducted at an applied current density of between about 0.5 mA cm$^{-2}$ and about 200 mA cm$^{-2}$.

55. The process according to claim 39, wherein the iron or iron oxide has an average particle size less than about 200 nm.

56. The process according to claim 39, wherein the melting point of the molten hydroxide electrolyte is about 170° C., about 195° C., about 200° C., about 215° C. or about 225° C.

57. A process for the production of ammonia comprising electrolysis of air and water between an anode and a cathode in a molten hydroxide electrolyte or an aqueous hydroxide electrolyte, the electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a nitrogen gas partial pressure of between about 100 bar and about 10,000 bar, and
wherein the molten hydroxide electrolyte or the aqueous hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

58. The process of claim 57, wherein carbon dioxide is not formed during the process.

59. The process according to claim 57, wherein the molten hydroxide electrolyte or the aqueous hydroxide electrolyte is selected from alkali metal hydroxides, alkali earth metal hydroxides, and any combination thereof.

60. The process according to claim 57, wherein the molten hydroxide electrolyte or the aqueous hydroxide electrolyte is selected from lithium hydroxide, sodium hydroxide, potassium hydroxide, cesium hydroxide, and any combination thereof.

61. The process according to claim 57, wherein the molten hydroxide electrolyte or the aqueous hydroxide electrolyte comprises sodium hydroxide and potassium hydroxide.

62. The process according to claim 61, wherein the molar ratio of sodium hydroxide to potassium hydroxide is about 1:1.

63. The process according to claim 57, wherein the melting point of the molten hydroxide electrolyte or the aqueous hydroxide electrolyte is between about 25° C. and about 300° C.

64. The process according to claim 57, wherein the electrolysis is conducted at an applied current density of between about 0.5 mA cm$^{-2}$ and about 2000 mA cm$^{-2}$.

65. The process according to claim 57, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

66. The process according to claim 57, wherein the anode and cathode both comprise nickel.

67. The process according to claim 57, wherein the chemistry of the process can be expressed by equations (i), (ii), (iii) and (iv):

$$\text{cathode: } Fe_2O_3 + 3H_2O + 6e^- \rightarrow 2Fe + 6OH^- \quad (i)$$

$$\text{chemical: } 2Fe + 3H_2O + N_2 \rightarrow 2NH_3 + Fe_2O_3 \quad (ii)$$

$$\text{anode: } 6OH^- \rightarrow 3/2 O_2(g) + 3H_2O + 6e^- \quad (iii)$$

$$\text{net: } N_2 + 3H_2O \rightarrow 2NH_3 + 3/2 O_2 \quad (iv).$$

68. The process according to claim 57, wherein the process is conducted above the supercritical point of water.

69. The process according to claim 57, wherein the melting point of the molten hydroxide electrolyte is between about 100° C. and about 300° C.

70. The process according to claim 57, wherein the melting point of the molten hydroxide electrolyte is between about 150° C. and about 250° C.

71. The process according to claim 57, wherein the electrolysis is conducted at an applied current density of between about 0.5 mA cm$^{-2}$ and about 200 mA cm$^{-2}$.

72. The process according to claim 57, wherein the iron or iron oxide has an average particle size less than about 200 nm.

73. The process according to claim 57, wherein the melting point of the molten hydroxide electrolyte is about 170° C., about 195° C., about 200° C., about 215° C. or about 225° C.

74. A process for the production of ammonia comprising electrolysis of air and water between an anode and a cathode in a molten hydroxide electrolyte or an aqueous hydroxide electrolyte, the electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a nitrogen gas partial pressure of between about 100 bar and about 10,000 bar, and wherein the process is conducted at a water vapor partial pressure of between about 1 bar and about 50 bar.

75. A process for the production of ammonia comprising electrolysis of air and water between an anode and a cathode in a molten hydroxide electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a water vapor partial pressure of between about 50 bar and about 221 bar.

76. The process of claim 75, wherein carbon dioxide is not formed during the process.

77. The process according to claim 75, wherein the molten hydroxide electrolyte is selected from alkali metal hydroxides, alkali earth metal hydroxides, and any combination thereof.

78. The process according to claim 75, wherein the molten hydroxide electrolyte is selected from lithium hydroxide, sodium hydroxide, potassium hydroxide, cesium hydroxide, and any combination thereof.

79. The process according to claim 75, wherein the molten hydroxide electrolyte comprises sodium hydroxide and potassium hydroxide.

80. The process according to claim 79, wherein the molar ratio of sodium hydroxide to potassium hydroxide is about 1:1.

81. The process according to claim 75, wherein the molten hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

82. The process according to claim 75, wherein the melting point of the molten hydroxide electrolyte is between about 25° C. and about 300° C.

83. The process according to claim 75, wherein the electrolysis is conducted at an applied current density of between about 0.5 mA cm$^{-2}$ and about 2000 mA cm$^{-2}$.

84. The process according to claim 75, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

85. The process according to claim 75, wherein the anode and cathode both comprise nickel.

86. The process according to claim 75, wherein the process is conducted at a nitrogen gas partial pressure of between about 1 bar and about 100 bar.

87. The process according to claim 75, wherein the chemistry of the process can be expressed by equations (i), (ii), (iii) and (iv):

$$\text{cathode: } Fe_2O_3 + 3H_2O + 6e^- \rightarrow 2Fe + 6OH^- \quad (i)$$

$$\text{chemical: } 2Fe + 3H_2O + N_2 \rightarrow 2NH_3 + Fe_2O_3 \quad (ii)$$

$$\text{anode: } 6OH^- \rightarrow 3/2O_2(g) + 3H_2O + 6e^- \quad (iii)$$

$$\text{net: } N_2 + 3H_2O \rightarrow 2NH_3 + 3/2O_2 \quad (iv)$$

88. The process according to claim 75, wherein the process is conducted above the supercritical point of water.

89. The process according to claim 75, wherein the melting point of the molten hydroxide electrolyte is between about 100° C. and about 300° C.

90. The process according to claim 75, wherein the melting point of the molten hydroxide electrolyte is between about 150° C. and about 250° C.

91. The process according to claim 75, wherein the electrolysis is conducted at an applied current density of between about 0.5 mA cm$^{-2}$ and about 200 mA cm$^{-2}$.

92. The process according to claim 75, wherein the iron or iron oxide has an average particle size less than about 200 nm.

93. The process according to claim 75, wherein the melting point of the molten hydroxide electrolyte is about 170° C., about 195° C., about 200° C., about 215° C. or about 225° C.

94. A process for the production of ammonia comprising electrolysis of air and water between an anode and a cathode in a molten hydroxide electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a nitrogen gas partial pressure of between about 100 bar and about 10,000 bar, and wherein the process is conducted at a water vapor partial pressure of between about 1 bar and about 50 bar.

95. The process of claim 94, wherein carbon dioxide is not formed during the process.

96. The process according to claim 94, wherein the molten hydroxide electrolyte is selected from alkali metal hydroxides, alkali earth metal hydroxides, and any combination thereof.

97. The process according to claim 94, wherein the molten hydroxide electrolyte is selected from lithium hydroxide, sodium hydroxide, potassium hydroxide, cesium hydroxide, and any combination thereof.

98. The process according to claim 94, wherein the molten hydroxide electrolyte comprises sodium hydroxide and potassium hydroxide.

99. The process according to claim 98, wherein the molar ratio of sodium hydroxide to potassium hydroxide is about 1:1.

100. The process according to claim 94, wherein the molten hydroxide electrolyte further comprises one or more alkali metal carbonates, alkali earth metal carbonates, alkali metal oxides, alkali earth metal oxides, alkali metal halides, alkali earth metal halides, alkali metal sulfates, alkali earth metal sulfates, alkali metal nitrates, alkali earth metal nitrates, alkali metal halates, alkali earth metal halates, or any combination thereof.

101. The process according to claim 94, wherein the melting point of the molten hydroxide electrolyte is between about 25° C. and about 300° C.

102. The process according to claim 94, wherein the electrolysis is conducted at an applied current density of between about 0.5 mA cm$^{-2}$ and about 2000 mA cm$^{-2}$.

103. The process according to claim 94, wherein the anode and cathode each, independently comprises iron, zinc, aluminum, magnesium, bismuth, vanadium, manganese, nickel, silver, barium, calcium, strontium, lead, mercury, cadmium, chromium, tin, titanium, or any combination thereof.

104. The process according to claim 94, wherein the anode and cathode both comprise nickel.

105. The process according to claim 94, wherein the chemistry of the process can be expressed by equations (i), (ii), (iii) and (iv):

$$\text{cathode: } Fe_2O_3+3H_2O+6e^- \rightarrow 2Fe+6OH^- \quad \text{(i)}$$

$$\text{chemical: } 2Fe+3H_2O+N_2 \rightarrow 2NH_3+Fe_2O_3 \quad \text{(ii)}$$

$$\text{anode: } 6OH^- \rightarrow 3/2O_2(g)+3H_2O+6e^- \quad \text{(iii)}$$

$$\text{net: } N_2+3H_2O \rightarrow 2NH_3+3/2O_2 \quad \text{(iv)}$$

106. The process according to claim 94, wherein the melting point of the molten hydroxide electrolyte is between about 100° C. and about 300° C.

107. The process according to claim 94, wherein the melting point of the molten hydroxide electrolyte is between about 150° C. and about 250° C.

108. The process according to claim 94, wherein the electrolysis is conducted at an applied current density of between about 0.5 mA cm$^{-2}$ and about 200 mA cm$^{-2}$.

109. The process according to claim 94, wherein the iron or iron oxide has an average particle size less than about 200 nm.

110. The process according to claim 94, wherein the melting point of the molten hydroxide electrolyte is about 170° C., about 195° C., about 200° C., about 215° C. or about 225° C.

111. A process for the production of ammonia comprising electrolysis of air and water between an anode and a cathode in a molten hydroxide electrolyte comprising iron or an iron oxide, wherein the iron or iron oxide has (i) a Brunauer-Emmett-Teller surface area greater than about 10 m$^2$/g and/or (ii) an average particle size of less than about 5000 nm, wherein the process is conducted at a nitrogen gas partial pressure of between about 100 bar and about 10,000 bar, and wherein the process is conducted above the supercritical point of water.

* * * * *